(12) United States Patent
Wan

(10) Patent No.: US 11,588,626 B2
(45) Date of Patent: Feb. 21, 2023

(54) KEY DISTRIBUTION METHOD AND SYSTEM, AND APPARATUS

(71) Applicant: HUAWEI TECHNOLOGIES CO., LTD., Shenzhen (CN)

(72) Inventor: Rongfei Wan, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 128 days.

(21) Appl. No.: 16/926,690

(22) Filed: Jul. 11, 2020

(65) Prior Publication Data

US 2020/0351082 A1    Nov. 5, 2020

Related U.S. Application Data

(63) Continuation of application No. PCT/CN2018/112361, filed on Oct. 29, 2018.

(30) Foreign Application Priority Data

Jan. 11, 2018    (CN) .......................... 201810028060.2

(51) Int. Cl.
H04L 9/08    (2006.01)
H04L 9/40    (2022.01)

(52) U.S. Cl.
CPC ............ *H04L 9/083* (2013.01); *H04L 9/0841* (2013.01); *H04L 9/0866* (2013.01); *H04L 63/062* (2013.01); *H04L 63/0892* (2013.01)

(58) Field of Classification Search
None
See application file for complete search history.

(56) References Cited

U.S. PATENT DOCUMENTS

2008/0310425 A1*  12/2008  Nath ................... H04L 29/1283
                                                      370/395.54
2009/0116651 A1    5/2009  Liang et al.
(Continued)

FOREIGN PATENT DOCUMENTS

CN    101009910 A    8/2007
CN    101459875 A    6/2009
(Continued)

OTHER PUBLICATIONS

Wan Rongfei et al: "Identity based security for authentication and mobility in future ID oriented networks", 2018 International Conference on Information Networking (ICOIN), IEEE, Jan. 10, 2018, pp. 402-407, XP033334549.
(Continued)

*Primary Examiner* — William J. Goodchild
*Assistant Examiner* — Mayasa A. Shaawat
(74) *Attorney, Agent, or Firm* — Rimon PC

(57) ABSTRACT

This application provides a key distribution method, an apparatus, and a system, includes: determining, by an identity management server based on AAA authentication information, whether AAA authentication on the terminal succeeds; if the AAA authentication succeeds, sending the ID of the terminal to a key management server; and generating, by the key management server, a private key of the terminal and returning the private key to the management server. After negotiating with the terminal to generate a first key, the identity management server encrypts the ID and the private key of the terminal, and sends an encrypted ID and an encrypted private key to the terminal. The terminal obtains the ID and the private key of the terminal. According to the key distribution method, apparatus, and system provided in this application, communication security performance of the
(Continued)

terminal during ID-based registration authentication is improved.

4 Claims, 20 Drawing Sheets

(56) References Cited

U.S. PATENT DOCUMENTS

| | | | |
|---|---|---|---|
| 2015/0039883 | A1 | 2/2015 | Yoon et al. |
| 2015/0280920 | A1 | 10/2015 | Sumioka et al. |
| 2017/0150411 | A1* | 5/2017 | Zhong .................. H04L 29/06 |

FOREIGN PATENT DOCUMENTS

| | | |
|---|---|---|
| CN | 101640590 A | 2/2010 |
| CN | 101771535 A | 7/2010 |
| CN | 101867928 A | 10/2010 |
| CN | 101917715 A | 12/2010 |
| CN | 105761078 A | 7/2016 |
| CN | 106850699 A | 6/2017 |
| CN | 107317789 A | 11/2017 |
| JP | 2005303485 A | 10/2005 |
| WO | 2010127683 A1 | 11/2010 |
| WO | 2015001600 A1 | 1/2015 |
| WO | WO-2017185999 A1 * | 11/2017 ........... H04L 9/0841 |

OTHER PUBLICATIONS

Ruidong Li et al: "A proactive scheme for securing ID/locator split architecture", 2012 20th IEEE International Conference on Network Protocols (ICNP), IEEE, Oct. 30, 2012 (Oct. 30, 2012), pp. 1-6, XP032329214.

Wang Donghui et al: "IBS enabled authentication for IoT in ION framework", 2017 Global Internet of Things Summit (GIOTS), IEEE, Jun. 6, 2017 (Jun. 6, 2017), pp. 1-6, XP033145238.

Barisch M et al: "Integrating user Identity Management systems with the Host Identity Protocol", IEEE Symposium on Computers and Communications, 2009. ISCC 2009, IEEE, Piscataway, NJ, USA, Jul. 5, 2009 (Jul. 5, 2009), pp. 830-836, XP031510496.

V. Fajardo, Ed et al. Diameter Base Protocol, RFC 6733, Oct. 2012. total 152 pages.

3GPP TS 29.272 V15.2.0 (Dec. 2017), 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15), Dec. 2017. total 165 pages.

3GPP TS 29.212 V15.1.0 (Dec. 2017), 3rd Generation Partnership Project; Technical Specification Group Core Network and Terminals;Policy and Charging Control (PCC); Reference points (Release 15), Dec. 2017. total 281 pages.

C. Rigney et al. Remote Authentication Dial In User Service (RADIUS), RFC2865, Jun. 2000, total 76 pages.

C. Rigney et al. RADIUS Accounting, RFC2866, Jun. 2000, total 28 pages.

R. Stewart, Stream Control Transmission Protocol, RFC4960, Sep. 2007. total 152 pages.

M. Tuexen et al. Datagram Transport Layer Security (DTLS) for Stream Control Transmission Protocol (SCTP), RFC6083, Jan. 2011, total 9 pages.

Zhang Yufei et al.,"An Escrow-Free Anonymous Key Distribution Protocol in Mobile IPv6 Network", J. Wuhan Univ. (Nat. Sci. Ed ), vol. 58, No. 6; Dec. 2012; pp. 497-502.

* cited by examiner

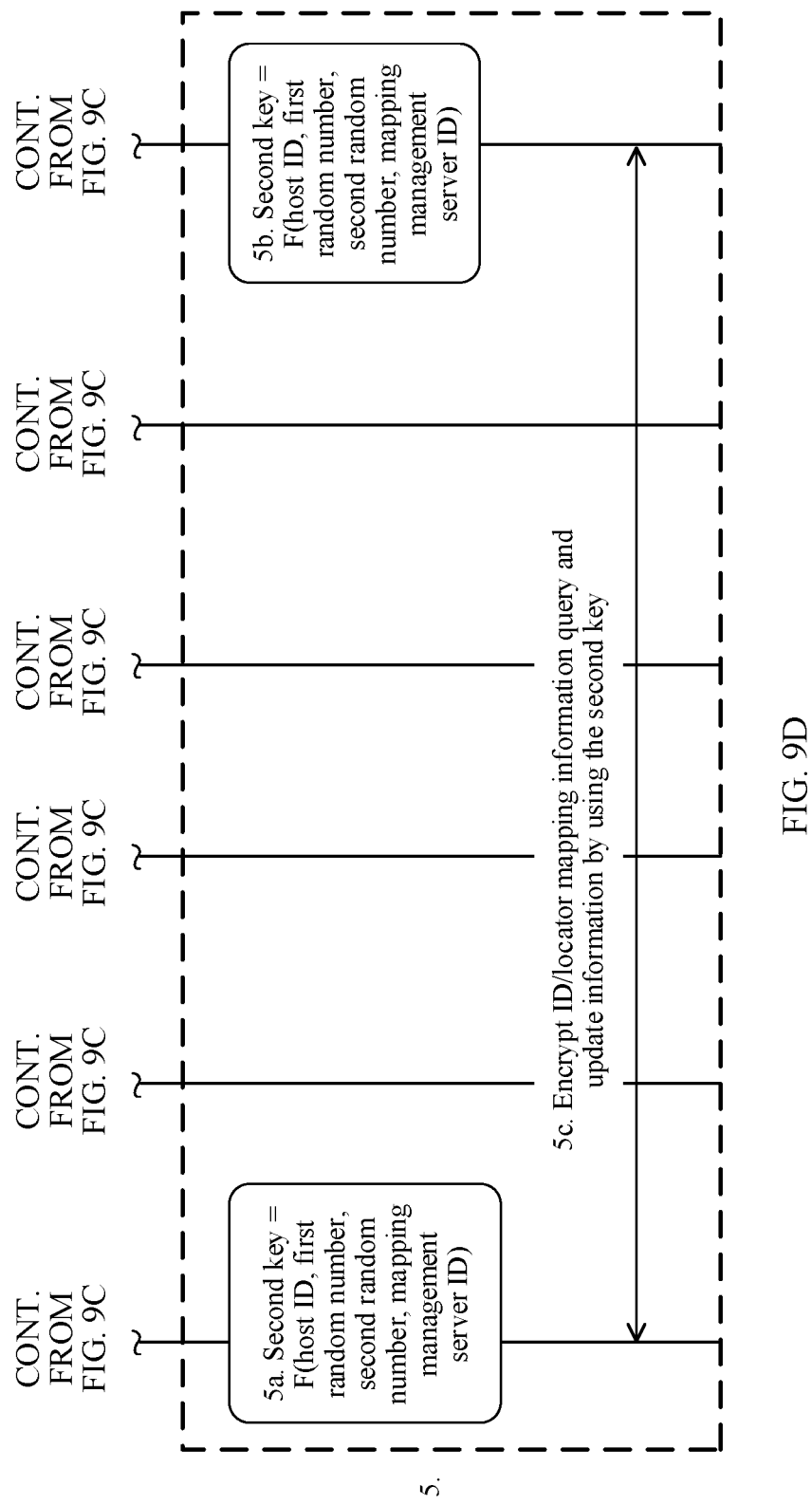

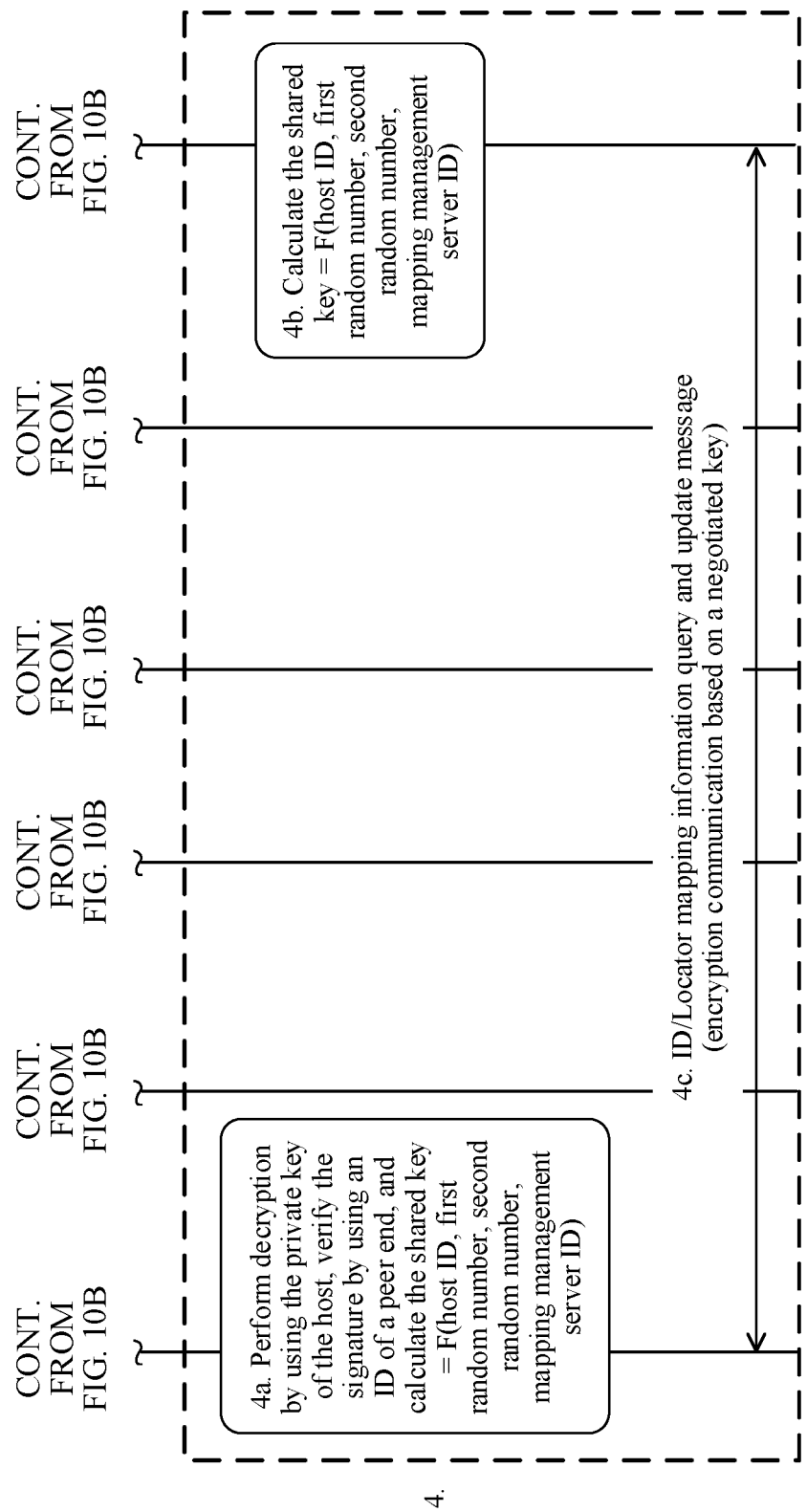

KEY DISTRIBUTION METHOD AND SYSTEM, AND APPARATUS

CROSS-REFERENCE TO RELATED APPLICATIONS

This application is a continuation of International Application No. PCT/CN2018/112361, filed on Oct. 29, 2018, which claims priority to Chinese Patent Application No. 201810028060.2, filed on Jan. 11, 2018. The disclosures of the aforementioned applications are hereby incorporated by reference in their entireties.

TECHNICAL FIELD

This application relates to communication technologies, and in particular, to a key distribution method and system, and an apparatus.

BACKGROUND

During access to the Internet, authentication of a transport layer and a network layer on a terminal succeeds. However, the transport layer and the network layer are closely combined, and do not independently implement their respective functions. An IP address is responsible for both an addressing function and a function of identifying a communications device node. Due to the dual function of the IP address, when the IP address changes, not only a route changes, but also an identifier for identifying a communications device host changes. As a result, application connection interruption occurs due to the change of the device identifier.

In research on a next-generation IP protocol in the prior art, adding an identity ID (a network identity or identifier) of a terminal to an IP protocol layer in a terminal access network is a current mainstream research direction. Representative protocols include HIP, LISP, ION (SLIM), ILNP, and ILA. The terminal that accesses the Internet implements mobility by using a dual address manner of a home address (Home Address, HoA) and a care-of address (Care-of Address, CoA) in a mobile IP scenario according to protocols such as MIPv4/6. In addition, an original connection keeps unchanged. For example, a home address is used as an ID of the terminal. In this way, the ID used as the identity of the terminal keeps unchanged when the terminal moves, and the IP address is responsible for only the addressing function while the function of identifying a communications device is implemented by using the ID.

In an ION network architecture, when the ID of the terminal is added to the network layer in the access network, AAA authentication is first performed on the terminal when the terminal accesses the Internet. After the AAA authentication on the terminal succeeds and obtains a locator (for example, an IP address) of the terminal, registration and authentication are further performed on the ID for identifying terminal identity information. During the authentication, the terminal sends a registration request message to an identity management server responsible for terminal ID management in the Internet, and the identity management server obtains the ID of the terminal and a private key of the terminal and sends the ID of the terminal and the private key of the terminal to the terminal, so that the terminal performs encryption and signs a signature based on an identity-based cryptography IBC technology by using the ID and the private key of the terminal. However, when key information such as the private key and the ID of the terminal is transmitted by using the existing technology, information security of the private key and the ID of the terminal is not ensured by using a secure communication manner such as encryption and authentication at the network layer in which the ID is located. As a result, important information such as the ID and the private key of the terminal is prone to leakage, and communication security performance when ID-based registration and authentication are performed on the terminal.

SUMMARY

This application provides a key distribution method and system, and an apparatus, to improve communication security performance when a terminal performs ID-based registration and authentication.

According to a first aspect, an embodiment of this application provides a key distribution method. The method is used by a terminal registration and authentication system to distribute an ID and a private key of a terminal to the terminal when identity ID-based registration is performed on the terminal. The terminal registration and authentication system includes an identity management server, a mapping management server, a key management server, and an authentication, authorization, and accounting AAA server. The terminal is connected to the terminal registration and authentication system by using a unified access gateway UAG. The method includes:

sending, by the terminal, an ID registration request message to the identity management server by using the UAG, to request to register the ID of the terminal, where the ID registration request message includes AAA authentication information;

receiving, by the identity management server, the ID registration request message; determining, based on the AAA authentication information, whether AAA authentication on the terminal succeeds; and if the AAA authentication on the terminal succeeds, allocating the ID to the terminal, and sending the ID of the terminal to the key management server;

receiving, by the key management server, the ID of the terminal, generating the private key of the terminal based on the ID of the terminal, and sending the private key to the identity management server;

negotiating, by the terminal and the identity management server, to generate a first key; and sending, by the identity management server to the terminal by using the UAG, the ID and the private key of the terminal that are encrypted by using the first key.

The key distribution method provided in the first aspect of the embodiment of this application is used for negotiation and distribution of a communication key used between the terminal and the identity management server in a key distribution system. Based on an AAA authentication mechanism, when the identity management server performs ID-based registration on the terminal, the ID and the private key of the terminal are encrypted by using the first key generated through negotiation between the identity management server and the terminal. In this way, security of information transmission between the identity management server and the terminal is ensured, communication security performance when ID-based registration and authentication are performed on the terminal is improved, and extension based on AAA authentication is implemented. In addition, the key distribution method is compatible with an existing network authentication method, and may also become a basis for end-to-end secure communication in a constructed network architecture of the ID-based registration and authentication.

In a possible implementation of this application, after the sending, by the identity management server to the terminal by using the UAG, the ID and the private key of the terminal that are encrypted by using the first key, the method in the foregoing embodiment may further include:

negotiating, by the terminal and the mapping management server, to generate a second key, where the second key is used to encrypt a communication message between the terminal and the mapping management server, and the mapping management server provides the terminal with an ID-locator mapping query service.

Based on the foregoing embodiment, in the key distribution method provided in the embodiment, negotiation between the terminal and the mapping management server is further implemented for the communication key. When the mapping server provides the terminal with ID-locator query and update services, the second key used to encrypt the communication message can be first negotiated, and then communication between the two parties is performed, thereby further improving communication security performance during the ID-based registration and authentication.

In a possible implementation of this application, in the method in the foregoing embodiment, the determining, by the identity management server based on the AAA authentication information, whether AAA authentication on the terminal succeeds includes:

sending, by the identity management server, the AAA authentication information of the terminal to the AAA server;

determining, by the AAA server based on the AAA authentication information, whether the AAA authentication on the terminal succeeds; and sending an AAA authentication result of the terminal to the identity management server; and determining, by the identity management server based on the AAA authentication result, whether the AAA authentication on the terminal succeeds.

In a possible implementation of this application, before the sending, by the terminal, an ID registration request message to the identity management server by using the UAG, the method in the foregoing embodiment may further include:

sending, by the AAA server, AAA authentication information of the terminal to the identity management server; and the determining, by the identity management server based on the AAA authentication information, whether AAA authentication on the terminal succeeds includes:

determining, by the identity management server, whether the AAA authentication information of the terminal that is sent by the AAA server is the same as the AAA authentication information included in the registration and authentication request message sent by the terminal; and if the AAA authentication information of the terminal that is sent by the AAA server is the same as the AAA authentication information included in the registration and authentication request message sent by the terminal, determining that the AAA authentication on the terminal succeeds.

In the key distribution method provided in the embodiment, after receiving the ID request of the terminal, the identity management server first determines whether the AAA authentication on the terminal succeeds. A specific manner of determining may be sending the AAA authentication information to the AAA server for comparison or receiving the AAA authentication information of the terminal in advance. Based on the AAA authentication, ID-based registration of the terminal is implemented. Therefore, the key distribution method is compatible with an existing network authentication method, and may also become a basis for end-to-end secure communication in a constructed ID-based network architecture.

In a possible implementation of this application, after the sending, by the identity management server to the terminal by using the UAG, the ID and the private key of the terminal that are encrypted by using the first key, the method in the foregoing embodiment may further include:

sending, by the terminal, a mapping registration request message to the identity management server to request the mapping management server to register the terminal, where the mapping registration request message includes the ID of the terminal, a locator of the terminal, and a first random number encrypted by using an ID of the identity management server, and the mapping registration request message is signed by using the private key of the terminal;

receiving, by the identity management server, the mapping registration request message; verifying, by using the ID of the terminal, a signature obtained by using the private key of the terminal; obtaining the first random number through decryption by using a private key of the identity management server; and sending a mapping authentication request message to the mapping management server;

receiving, by the mapping management server, the mapping registration request message; establishing a mapping relationship between the ID of the terminal and the locator of the terminal; generating a second random number; and sending the second random number to the identity management server;

receiving, by the identity management server, the second random number; and sending, to the terminal, the second random number that is signed by using the private key of the identity management server and that is encrypted by using the ID of the terminal;

receiving, by the terminal, the second random number that is encrypted by using the ID of the terminal; verifying, by using the ID of the identity management server, a signature obtained by using the private key of the identity management server; and obtaining the second random number through decryption by using the private key of the terminal; and obtaining, by the terminal and the mapping management server, the second key through calculation based on the first random number, the second random number, the ID of the terminal, and an ID of the mapping management server, where the second key is used to encrypt a communication message between the terminal and the mapping management server, and the mapping management server provides the terminal with the ID-locator mapping query service.

In the key distribution method in the embodiment provided in the embodiment, when the ID of the terminal has been registered, only authentication based on the ID of the terminal is performed when authentication is performed on the terminal subsequently, instead of performing the AAA authentication on the terminal again, thereby simplifying a process of authenticating the terminal.

According to a second aspect, an embodiment of this application provides a key distribution method, including:

receiving, by an identity management server, an ID registration request message that is sent by a terminal by using a unified access gateway UAG, to request to register an ID of the terminal, where the ID registration request message includes AAA authentication information;

determining, by the identity management server based on the AAA authentication information, whether AAA authentication on the terminal succeeds; and if the AAA authentication on the terminal succeeds, allocating the ID to the terminal, and sending the ID of the terminal to a key management server;

receiving, by the identity management server, a private key of the terminal that is sent by the key management server, where the private key is generated by the key management server by using the identity ID of the terminal as a public key;

negotiating, by the terminal and the identity management server, to generate a first key; and sending, by the identity management server to the terminal by using the UAG, the ID and the private key of the terminal that are encrypted by using the first key.

In a possible implementation of this application, in the method in the foregoing embodiment, the determining, by the identity management server based on the AAA authentication information, whether AAA authentication on the terminal succeeds includes:

sending, by the identity management server, the AAA authentication information of the terminal to an AAA server;

receiving, by the identity management server, an AAA authentication result of the terminal that is sent by the AAA server; and determining, by the identity management server based on the AAA authentication result, whether the AAA authentication on the terminal succeeds.

In a possible implementation of this application, before the receiving, by an identity management server, an ID registration request message that is sent by a terminal by using a UAG, the method in the foregoing embodiment may further include:

receiving, by the identity management server, AAA authentication information of the terminal that is sent by the AAA server; and the determining, by the identity management server based on the AAA authentication information, whether AAA authentication on the terminal succeeds specifically includes:

determining, by the identity management server, whether the AAA authentication information of the terminal that is sent by the AAA server is the same as the AAA authentication information included in the registration and authentication request message sent by the terminal; and if the AAA authentication information of the terminal that is sent by the AAA server is the same as the AAA authentication information included in the registration and authentication request message sent by the terminal, determining that the AAA authentication on the terminal succeeds.

After the sending, by the identity management server to the terminal by using the UAG, the ID and the private key of the terminal that are encrypted by using the first key, the method further includes:

receiving, by the identity management server, a mapping registration request message sent by the terminal, to request a mapping management server to register the terminal, where the mapping registration request message includes the ID of the terminal, a location of the terminal, and a first random number encrypted by using an ID of the identity management server, and the mapping registration request message is signed by using the private key of the terminal;

verifying, by the identity management server by using the ID of the terminal, a signature obtained by using the private key of the terminal; obtaining the first random number through decryption by using a private key of the identity management server; and sending a mapping authentication request message to the mapping management server;

receiving, by the identity management server, a second random number that is generated and sent by the mapping management server; and sending, by the identity management server to the terminal, the second random number that is signed by using the private key of the identity management server and that is encrypted by using the ID of the terminal, so that the terminal obtains the second random number through decryption by using the private key of the terminal and verifies, by using the ID of the identity management server, a signature obtained by using the private key of the identity management server, the terminal and the mapping management server obtain the second key through calculation based on the first random number, the second random number, the ID of the terminal, and an ID of the mapping management server, and the mapping management server provides the terminal with an ID-locator mapping query service.

According to a third aspect, an embodiment of this application provides a key distribution method, including:

sending, by a terminal, an ID registration request message to an identity management server by using a unified access gateway UAG, to request to register an ID of the terminal, where the ID registration request message includes AAA authentication information;

negotiating, by the terminal and the identity management server, to generate a first key;

receiving, by the terminal, the ID of the terminal and a private key of the terminal that are encrypted by using the first key and that are sent by the identity management server, where the private key is generated by a key management server by using the identity ID of the terminal as a public key; and obtaining, by the terminal, the ID of the terminal and the private key of the terminal through decryption by using the first key.

In a possible implementation of this application, after the obtaining, by the terminal, the ID of the terminal and the private key of the terminal through decryption by using the first key, the method in the foregoing embodiment may further include:

negotiating, by the terminal and a mapping management server, to generate a second key, where the second key is used to encrypt a communication message between the terminal and the mapping management server, and the mapping management server provides the terminal with an ID-locator mapping query service.

In a possible implementation of this application, after the obtaining, by the terminal, the ID of the terminal and the private key of the terminal through decryption by using the first key, the method in the foregoing embodiment may further include:

sending, by the terminal, a mapping registration request message to the identity management server by using the UAG, to request the mapping management server to register the terminal, where the mapping registration request message includes the ID of the terminal, a locator of the terminal, and a first random number encrypted by using an ID of the identity management server, and the mapping registration request message is signed by using the private key of the terminal;

receiving, by the terminal, a second random number that is signed by using a private key of the identity management server, encrypted by using the ID of the terminal, and sent by the identity management server;

verifying, by the terminal by using the ID of the identity management server, a signature obtained by using the private key of the identity management server; and obtaining the second random number through decryption by using the private key of the terminal; and obtaining, by the terminal, the second key through calculation based on the first random number, the second random number, the ID of the terminal, and an ID of the mapping management server, where the second key is used to encrypt a communication message between the terminal and the mapping management server; and the mapping management server provides the terminal with the ID-locator mapping query service.

According to a fourth aspect, an embodiment provides an identity management server, including:

a receiving module, where the receiving module is configured to receive an ID registration request message that is sent by a terminal by using a unified access gateway UAG, to request to register an ID of the terminal, where the ID registration request message includes AAA authentication information; and a processing module, where the processing module is configured to: determine, based on the AAA authentication information, whether AAA authentication on the terminal succeeds; and if the AAA authentication on the terminal succeeds, allocate the ID to the terminal, and send the ID of the terminal to a key management server, where the receiving module is further configured to receive a private key of the terminal that is sent by the key management server, where the private key is generated by the key management server by using the identity ID of the terminal as a public key; and the processing module is further configured to negotiate with the terminal to generate a first key; and a sending module, where the sending module is configured to send, to the terminal by using the UAG, the ID and the private key of the terminal that are encrypted by using the first key.

In a possible implementation of this application, the server in the foregoing embodiment may further include:

the sending module is further configured to send AAA authentication information of the terminal to an AAA server;

the receiving module is further configured to receive an AAA authentication result of the terminal that is sent by the AAA server; and the processing module is further configured to determine, based on the AAA authentication result, whether the AAA authentication on the terminal succeeds.

In a possible implementation of this application, the method in the foregoing embodiment may further include:

the receiving module is further configured to receive the AAA authentication information of the terminal that is sent by the AAA server; and the processing module is specifically configured to: determine whether the AAA authentication information of the terminal that is sent by the AAA server is the same as the AAA authentication information included in the registration and authentication request message sent by the terminal; and if the AAA authentication information of the terminal that is sent by the AAA server is the same as the AAA authentication information included in the registration and authentication request message sent by the terminal, determine that the AAA authentication on the terminal succeeds.

In a possible implementation of this application, the server in the foregoing embodiment may further include:

the receiving module is further configured to receive a mapping registration request message sent by the terminal, to request a mapping management server to register the terminal, where the mapping registration request message includes the ID of the terminal, a location of the terminal, and a first random number encrypted by using an ID of the identity management server, and the mapping registration request message is signed by using the private key of the terminal;

the processing module is further configured to: verify, by using the ID of the terminal, a signature obtained by using the private key of the terminal; obtain the first random number through decryption by using the private key of the identity management server; and send a mapping authentication request message to the mapping management server;

the receiving module is further configured to receive a second random number that is generated and sent by the mapping management server; and the sending module is further configured to: send, to the terminal, the second random number that is signed by using the private key of the identity management server and that is encrypted by using the ID of the terminal, so that the terminal obtains the second random number through decryption by using the private key of the terminal and verifies, by using the ID of the identity management server, a signature obtained by using the private key of the identity management server, the terminal and the mapping management server obtain the second key through calculation based on the first random number, the second random number, the ID of the terminal, and an ID of the mapping management server, and the mapping management server provides the terminal with an ID-locator mapping query service.

According to a fifth aspect, an embodiment of this application provides a terminal, including:

a sending module, where the sending module is configured to send an ID registration request message to an identity management server by using a unified access gateway UAG, to request to register an ID of the terminal, where the ID registration request message includes AAA authentication information;

a processing module, where the processing module is configured to negotiate with the identity management server to generate a first key; and a receiving module, where the receiving module is configured to receive the ID of the terminal and a private key of the terminal that are encrypted by using the first key and that are sent by the identity management server, where the private key is generated by a key management server by using the identity ID of the terminal as a public key, where the processing module is further configured to obtain the ID of the terminal and the private key of the terminal through decryption by using the first key.

In a possible implementation of this application, the terminal in the foregoing embodiment may further include:

the processing module is further configured to negotiate with the mapping management server for a second key, where the second key is used to encrypt a communication message between the terminal and the mapping management server, and the mapping management server provides the terminal with an ID-locator mapping query service.

In a possible implementation of this application, the terminal in the foregoing embodiment may further include:

the sending module is further configured to send a mapping registration request message to the identity management server to request the mapping management server to register the terminal, where the mapping registration request message includes the ID of the terminal, a locator of the terminal, and a first random number encrypted by using an ID of the identity management server, and the mapping registration request message is signed by using the private key of the terminal;

the receiving module is configured to receive a second random number that is signed by using a private key of the identity management server, encrypted by using the ID of the terminal, and sent by the identity management server;

the processing module is configured to: verify, by using the ID of the identity management server, a signature obtained by using the private key of the identity management server; and obtain the second random number through decryption by using the private key of the terminal; and the processing module is further configured to obtain the second key through calculation based on the first random number, the second random number, the ID of the terminal, and an ID of the mapping management server, where the second key is used to encrypt a communication message between the terminal and the mapping management server, and the mapping management server provides the terminal with the ID-locator mapping query service.

According to a sixth aspect, an embodiment provides a key distribution system, including the identity management server in any one of the foregoing embodiments and the terminal in any one of the foregoing embodiments.

The embodiments of this application provide the key distribution method and system, and the apparatus. Negotiation and distribution of a communication key are performed between the terminal and the identity management server. Based on the AAA authentication mechanism, when the identity management server performs ID-based registration on the terminal, the ID and the private key of the terminal are encrypted by using the first key generated through negotiation between the identity management server and the terminal. In this way, security of information transmission between the identity management server and the terminal is ensured, communication security performance when ID-based registration and authentication are performed on the terminal is improved, and extension based on AAA authentication is implemented. In addition, the key distribution method is compatible with an existing network authentication method, and may also become a basis for end-to-end secure communication in a constructed network architecture of ID-based registration and authentication.

BRIEF DESCRIPTION OF DRAWINGS

FIG. 9A to FIG. 9D are a schematic flowchart of Embodiment 8 of a key distribution method according to this application;

FIG. 10A to FIG. 10C are a schematic flowchart of Embodiment 9 of a key distribution method according to this application;

DESCRIPTION OF EMBODIMENTS

Figure 1:
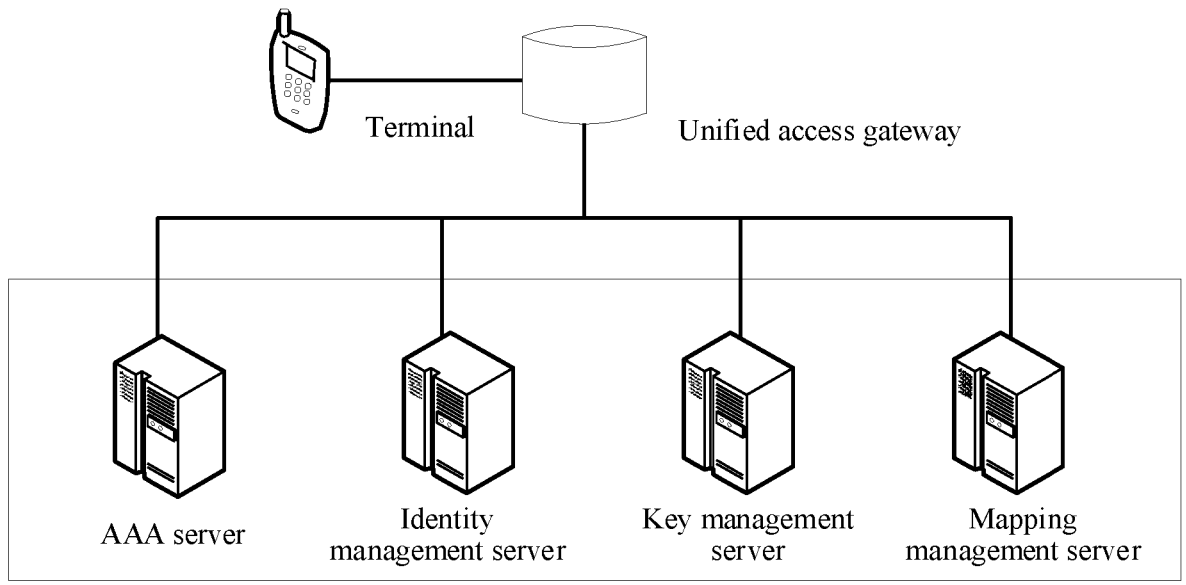
FIG. 1 is a schematic structural diagram of Embodiment 1 of a key distribution system according to this application.

FIG. 1 is a schematic structural diagram of Embodiment 1 of a key distribution system according to this application. In the system shown in FIG. 1, A terminal may be a mobile node (Mobile Node, MN for short), a host, or a mobile terminal device in the embodiment of this application. The terminal has a protocol processing function of an identity (Identification, ID for short) and Internet protocol (Internet Protocol, IP for short) information and an ID-based registration function. The terminal accesses a network by using a unified access gateway (Unified access gateway, UAG for short), and further interacts with and communicates with an authentication, authorization, and accounting (Authentication, Authorization, Accounting, AAA for short) server, an identity management server, a key management server, and a mapping management server by using the UAG. The terminal may be specifically any one or a combination of a terminal device (Terminal), user equipment (User Equipment), an Internet of things (Internet of Things, IoT) device, and the like. The terminal device may be a desktop computer (computer), a notebook computer (notebook), a tablet computer (PAD), or the like. The user equipment may be a smartphone (smart phone), a smartwatch (smart watch), smart glasses, or the like. The Internet of things device may be a smart bicycle, a smart car, a smart electrical appliance, or the like. It may be understood that the foregoing examples are merely used for description, and does not constitute a specific limitation.

The unified access gateway UAG has an AAA authentication processing function, a function of allocating a locator Locator (for example, an IP) of a terminal, and a function of querying a locator and an ID. The UAG is responsible for assisting a terminal in accessing a system in a unified manner. The UAG is used by the terminal to connect to a carrier network, and provides the terminal with a network access service and an IP address allocation service. Specifically, after the terminal accesses the UAG, the UAG requests the AAA server to authenticate the terminal, and is responsible for communication between the terminal and each of the identity management server, the key management server, and the mapping management server. In addition, the identity management server, the key management server, the mapping management server, and the following AAA server may communicate with each other by separately establishing an independent connection relationship; or may interact with and communicate with each other by all using the UAG after setting. In actual application, this does not affect implementation of the embodiment of this application.

A terminal registration and authentication system in the embodiment of this application may be a generic resilient identity service (Generic Resilient ID Services, GRIDS) system. The GRIDS system is a terminal identity registration and authentication system provided in the embodiment of this application. Different carrier networks have different GRIDS systems. Specifically, the GRIDS system may include the following logic entities: an ID management system, a name mapping system, an identity key management system, and an AAA system, to implement functions of the foregoing corresponding server. The terminal registration and authentication system in the embodiment of this application includes an identity management server, a mapping management server, a key management server, and an authentication, authorization, and accounting AAA server. The terminal is connected to the terminal registration and authentication system by using the unified access gateway UAG. The server in the embodiment of this application may be a server in the GRIDS system, or may be another server that performs a same or similar function. Details are as follows.

The identity management server may be the ID management system or an ID management server (ID management system, IDMS for short) in the GRIDS. The identity management server provides the terminal with an ID registration and authentication service. After the terminal accesses the GRIDS by using the UAG, the terminal may first send an ID registration request to the identity management server. After the identity management server registers the ID of the terminal, the terminal obtains a private key of the ID, so that the terminal can process a communication message between the terminal and the GRIDS in a signing manner by using the private key based on an ID-based signing technology IBC technology.

The mapping management server may be a name mapping system (Name Management System, NMS for short) in the GRIDS. The mapping management server can provide the terminal with an ID-locator (Locator, for example, an IP address) query service.

The key management server may be an identity key management system (Identity Key Management System, IKMS for short) in the GRIDS. The key management server is responsible for generating a private key of a terminal. The key management server can generate a corresponding private key service based on the ID of the terminal by using an identity-based cryptography IBC technology. In addition, the key management server has a key generator (Private key Generator, PKG for short) function. Specifically, the key management server generates the corresponding private key based on a public key of the terminal. The public key and the private key of the terminal are paired for use. In other words, when one party in communication uses the private key of the terminal for signing to obtain a signature, the other party can verify the signature only by using the public key of the terminal. In the embodiment of this application, the ID of the terminal is used as a public key of the terminal. Specifically, the key management server may generate, based on the ID of the terminal, the private key corresponding to the ID of the terminal; and further send the private key of the terminal to the terminal. It should be noted that, in a possible embodiment, the key management server may be deployed in the identity management server. In other words, the key management server exists as a part of a functional entity of the identity management server. In another possible embodiment, the key management server and the identity management server may separately exist as independent functional entities.

The authentication, authorization, and accounting (Authentication Authorization Accounting, AAA) server may be the AAA system in the GRIDS. The AAA server is configured to authenticate a terminal. The authentication (Authentication) means to confirm a user identity. The authorization (Authorization) means to determine whether a user is authorized to use a network resource. The accounting (Accounting) means to monitor a status of the user in using the network resource. The user can be charged based on a detection record. It should be noted that, in a possible embodiment, the AAA server is deployed inside the GRIDS system; or in another possible embodiment, the AAA server may be deployed outside the GRIDS system.

It should be further understood that, in the embodiment of this application, the identity management server, the mapping management server, the key management server, and the AAA system are all logical entities. These logical entities may be very flexibly deployed. For example, the identity management server, the mapping management server, the key management server, and the AAA system may be separately independently deployed, may be centrally deployed (for example, deployed in a same server), or may be deployed together with another device. This is not specifically limited in this application.

In addition, in an actual application, actual product names of the identity management server, the mapping management server, the key management server, and the AAA system may be different in different systems. For example, an identity key management system in some products is referred to as a private-key generator (Private-Key Generator, PKG). It may be understood that a change of a product name does not affect substance of the identity key management system.

Specifically, after the terminal accesses the UAG, the UAG requests the AAA server in the GRIDS to authenticate the terminal, and the AAA server authenticates the terminal and then returns an authentication result to the UAG. After allocating a locator to the terminal, the UAG sends the locator and the AAA authentication result to the terminal. After the AAA authentication on the terminal succeeds and obtains the locator, the GRIDS further performs registration and authentication on the ID for identifying identity information of the terminal. During the authentication, the terminal sends, to the identity management server responsible for managing an ID of a terminal in the GRIDS, an ID registration request message carrying the AAA authentication information. After the identity management server verifies the identity of the terminal based on the AAA authentication information, the identity management server allocates the ID to the terminal and obtains the private key of the terminal by requesting the key management server based on the ID of the terminal. Then, the identity management server sends the ID and the private key of the terminal to the terminal, so that the terminal can perform encryption and sign a signature based on the ID and the private key of the terminal by using the identity-based cryptography IBC technology. However, in the prior art, when sending the ID and the key of the terminal to the terminal, the identity management server does not provide information security protection for the ID of the terminal and the private key of the terminal. In this case, the ID and the private key of the terminal, as important identification information of the terminal, are prone to leakage or stealing in a communication environment in which security is not ensured. As a result, security performance is relatively low when ID-based registration and authentication communication is performed on the terminal.

However, in this application, to improve security performance when the ID-based registration and authentication are performed on the terminal, after receiving the ID registration request message of the terminal, the identity management server in the GRIDS first verifies the identity of the terminal based on the AAA authentication information in the ID registration request message, and then requests the key management server to allocate the private key to the terminal. The key management server generates the private key of the terminal based on the ID of the terminal by using the identity-based cryptography IBC technology, and sends the private key of the terminal to the identity management server. After receiving the private key of the terminal that is sent by the key management server, the identity management server negotiates with the terminal to generate a first key used when the identity management server and the terminal share information. Then, the identity management server encrypts the private key by using the first key, and then sends the encrypted private key to the terminal, so that the terminal obtains the private key of the terminal through decryption by using the first key, thereby ensuring security performance in an information transmission process. Therefore, in the key distribution method of the ID-based terminal registration and authentication provided in this application, an ID-based terminal registration and authentication method and a key negotiation method are provided in a network structure of the ID-based registration and authentication, thereby simplifying a registration and authentication procedure and ensuring secure information transmission during the ID-based terminal registration and authentication.

Specifically, the ID provided in the embodiment of this application refers to an ID of a terminal (or a node) in an ID-oriented networking (ID-Oriented Networking, ION for short) protocol architecture. The ID specifically refers to an identifier (ID) of an identification layer. The identity of the terminal (or the node) may be a fixed identifier, for example, a device serial number, a mobile number, an international mobile equipment identity (International Mobile Equipment Identity, IMEI), an international mobile subscriber identity (International Mobile Subscriber Identity, IMSI), an IP multimedia private identity (IP Multimedia Private Identity, IMPI), or an IP multimedia public identity (IP Multimedia Public Identity, IMPU); or may be a temporarily allocated identifier, for example, a temporary mobile subscriber identity (Temporary Mobile Subscriber Identity, TMSI) or a globally unique temporary UE identity (Globally Unique Temporary UE Identity, GUTI).

The ION protocol architecture is a new communications protocol architecture. A difference between the ION protocol architecture and a conventional IPv6 protocol architecture is that in the ION protocol architecture, an identification layer (layer 3.5) is added between an IP layer (layer 3) and a transport layer (layer 4) of the IPv6 protocol architecture. In this way, all nodes (or terminals) using the ION protocol architecture may use an identifier of the identification layer as a unique unchanged identity. In addition, the identification layer is located above the IP layer. Therefore, a node (or a terminal) using the ION protocol architecture may perform addressing by using the IP layer based on the identifier of the identification layer.

Figure 2:
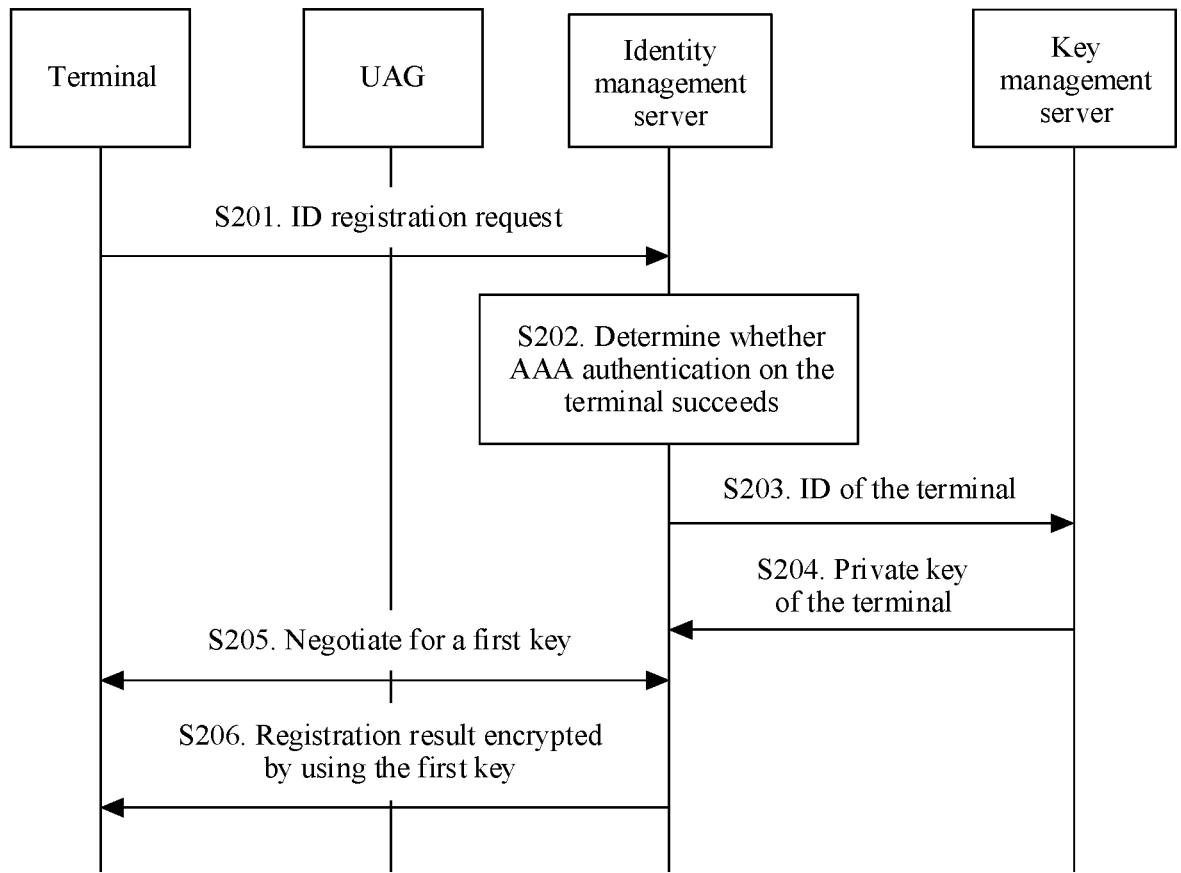
FIG. 2 is a schematic flowchart of Embodiment 1 of a key distribution method according to this application.

Specifically, FIG. 2 is a schematic flowchart of Embodiment 1 of a key distribution method according to this application. As shown in FIG. 2, the key distribution method provided in the embodiment includes the following steps.

S201. A terminal sends an ID registration request message to an identity management server by using a UAG, to request to register an ID of the terminal. The ID registration request message includes AAA authentication information of the terminal.

Specifically, the key distribution method in the embodiment is performed in the key distribution system shown in FIG. 1. The terminal sends, to the identity management server by using the UAG, the ID registration request message to request to perform ID-based registration on the terminal. The ID registration request message carries the AAA authentication information of the terminal. The terminal has succeeded in AAA authentication performed by an AAA server, and has obtained a locator (which may be an IP address) allocated by the UAG to the terminal and the AAA authentication information of the terminal from the AAA server. After being authenticated by the AAA server, the terminal sends the ID registration request message to the identity management server, so that the identity management server can verify the identity of the terminal based on the AAA authentication information of the terminal.

Optionally, the ID registration request message is implemented by adding the ID of the terminal to an AAA diameter protocol extension message. Specifically, an AVP based on the ID of the terminal is added to a capabilities exchange request (Capabilities-Exchange-Request, CER for short) message and a capabilities exchange answer (Capabilities-Exchange-Answer, CEA for short) message of the AAA diameter protocol. Specifically, a format of the CER message obtained after the AVP based on the ID of the terminal is added is as follows: <CER>::=<DiameterHeader:257, REQ>{Origin-Host}{Origin-Realm}1*{Host-IP-Address}1*{Host-UID}{Vendor-Id}{Product-Name}[Origin-State-Id]*[Supported-Vendor-Id]*[Auth-Application-Id]*[Inband-Security-Id]*[Acct-Application-Id]*[Vendor-Specific-Application-Id] [Firmware-Revision]*[AVP]. Herein, {Host-UID} is the ID of the terminal. A format of the CEA message obtained after the AVP based on the ID of the terminal is added is as follows: <CEA>::=<DiameterHeader: 257>{Result-Code}{Origin-Host}{Origin-Realm}1*{Host-IP-Address}{Host-UID}{Vendor-Id}{Product-Name}[Origin-State-Id][Error-Message] [Failed-AVP]*[Supported-Vendor-Id]*[Auth-Application-Id]*[Inband-Security][Acct-Application-Id]*[Vendor-Specific-Application-Id][Firmware-Revision]*[AVP]. Herein, {Host-UID} is the ID of the terminal. Optionally, the ID registration request message may be further implemented by using another message based on the diameter protocol, for example, a DWR, a DWA, a DPR, or a DPA. An AVP that supports the ID of the terminal is added to the message. A manner of implementation is the same as that in the foregoing example. Details are not described herein again.

S202. The identity management server determines, based on the AAA authentication information, whether the AAA authentication on the terminal succeeds.

Specifically, after receiving the ID registration request sent by the terminal, the identity management server first needs to determine whether the terminal passes the authentication of the AAA server. After the terminal passes the authentication of the AAA server, ID-based registration is performed on the terminal. In the embodiment of this application, the identity management server processes a message of an identification layer at layer 3.5 in an ION protocol. Therefore, after the AAA authentication on the terminal succeeds at a network IP layer at layer 3 and a network address is allocated to the terminal, the identity management server registers the ID of the terminal, so that the terminal can perform addressing by using the IP layer based on an ID of the identification layer.

Optionally, in a possible manner of determining in the embodiment, the identity management server sends the AAA authentication information of the terminal to the AAA server; and the AAA server determines based on the AAA authentication information of the terminal whether the AAA authentication on the terminal succeeds, and sends an AAA authentication result of the terminal to the identity management server. The authentication result may include two results: authenticated and unauthenticated. The identity management server determines based on the received AAA authentication result whether the AAA authentication on the terminal succeeds.

In another possible manner of determining in the embodiment, after performing the AAA authentication on the terminal, the AAA server sends the AAA authentication information of the terminal to the UAG, and further sends the AAA authentication information of the terminal to the identity management server. After receiving the ID registration request that is of the terminal and that carries the AAA authentication information, the identity management server verifies whether the AAA authentication information carried in the ID registration request is the same as the AAA authentication information of the terminal that is sent by the AAA server. If the AAA authentication information carried in the ID registration request is the same as the AAA authentication information of the terminal that is sent by the AAA server, it is determined that the AAA authentication on the terminal succeeds. If the AAA authentication information carried in the ID registration request is different from the AAA authentication information of the terminal that is sent by the AAA server, it is determined that the terminal does not pass the AAA authentication.

Therefore, in the key distribution method provided in the embodiment, based on the existing AAA authentication, registration and authentication are performed on the ID of the terminal after the AAA authentication. Therefore, extension based on the AAA authentication is implemented. In addition, the key distribution method is compatible with an existing network authentication method, and can also become a basis for end-to-end secure communication in a constructed network architecture of ID-based registration and authentication.

Optionally, the identity management server provided in the embodiment of this application uses a distributed system. Mobile switching is implemented when the terminal roams. Therefore, the terminal does not need to be authenticated in a central system, thereby reducing an authentication delay of the terminal in a mobile switching process.

S203. If the AAA authentication on the terminal succeeds, the identity management server allocates the ID to the terminal, and sends the ID of the terminal to the key management server.

Specifically, after receiving the ID registration request message sent by the terminal, the identity management server starts to perform ID-based registration on the terminal. The identity management server first allocates the ID to the terminal, and then sends the ID of the terminal to the key management server. The key management server generates a private key of the terminal.

S204. The key management server generates the private key of the terminal based on the ID of the terminal, and sends the private key to the identity management server.

Specifically, the key management server generates the unique private key corresponding to the ID by using the ID as a public key based on the ID of the terminal that is sent by the identity management server. The key management server may process the ID of the terminal by using an identity-based cryptography IBC technology, generate the private key of the terminal, and then send the private key of the terminal to the identity management server.

S205. The terminal and the identity management server negotiate to generate a first key.

Specifically, after the identity management server receives the private key of the terminal from the key management server, to ensure communication security when the private key is sent to the terminal, before the sending, the identity management server and the terminal negotiate for the first key, to encrypt communication information between the identity management server and the terminal. Optionally, the identity management server and the terminal may negotiate according to a key negotiation protocol to generate the first key. The key negotiation protocol includes a DH (Diffie Hellman) protocol, an IKE (Internet key exchange) protocol, and the like. This is not limited herein.

S205. The identity management server sends, to the terminal, the ID and the private key of the terminal that are encrypted by using the first key.

Specifically, after the identity management server and the terminal negotiate to generate the first key, the identity management server sends, to the terminal, the ID and the private key of the terminal that are encrypted by using the first key, so that the terminal receives the encrypted ID and the encrypted private key of the terminal, decrypts the encrypted ID and the encrypted private key of the terminal by using the first key, and extracts the ID and the private key of the terminal. Therefore, information security is ensured in a process in which the identity management server sends the ID and the private key of the terminal to the terminal, and security performance is ensured in an information transmission process when the ID-based registration is performed on the terminal.

In conclusion, the key distribution method provided in the embodiment is used for negotiation and distribution of a communication key used between the terminal and the identity management server in the key distribution system. Specifically, after receiving the ID registration request message sent by the terminal, the identity management server determines based on the AAA authentication information in the ID registration request message whether the AAA authentication on the terminal succeeds; and if AAA authentication on the terminal is performed, allocates the ID to the terminal, and sends the ID of the terminal to the key management server. The key management server generates the private key of the terminal based on the ID of the terminal, and returns the private key of the terminal to the identity management server. After the identity management server and the terminal negotiate to generate the first key, the identity management server encrypts the ID and the private key of the terminal by using the first key, and sends, to the terminal, the encrypted ID and the encrypted private key of the terminal. After receiving the encrypted ID and the encrypted private key of the terminal, the terminal decrypts the encrypted ID and the encrypted private key of the terminal by using the first key, and obtains the ID and the private key of the terminal. In the key distribution method provided in the embodiment of this application, based on an AAA authentication mechanism, when performing ID-based registration on the terminal, the identity management server encrypts the ID and the private key of the terminal by using the first key that is generated through negotiation between the identity management server and the terminal, thereby ensuring security of information transmission between the identity management server and the terminal and improving communication security performance when the ID-based registration and authentication are performed on the terminal.

Figure 3:
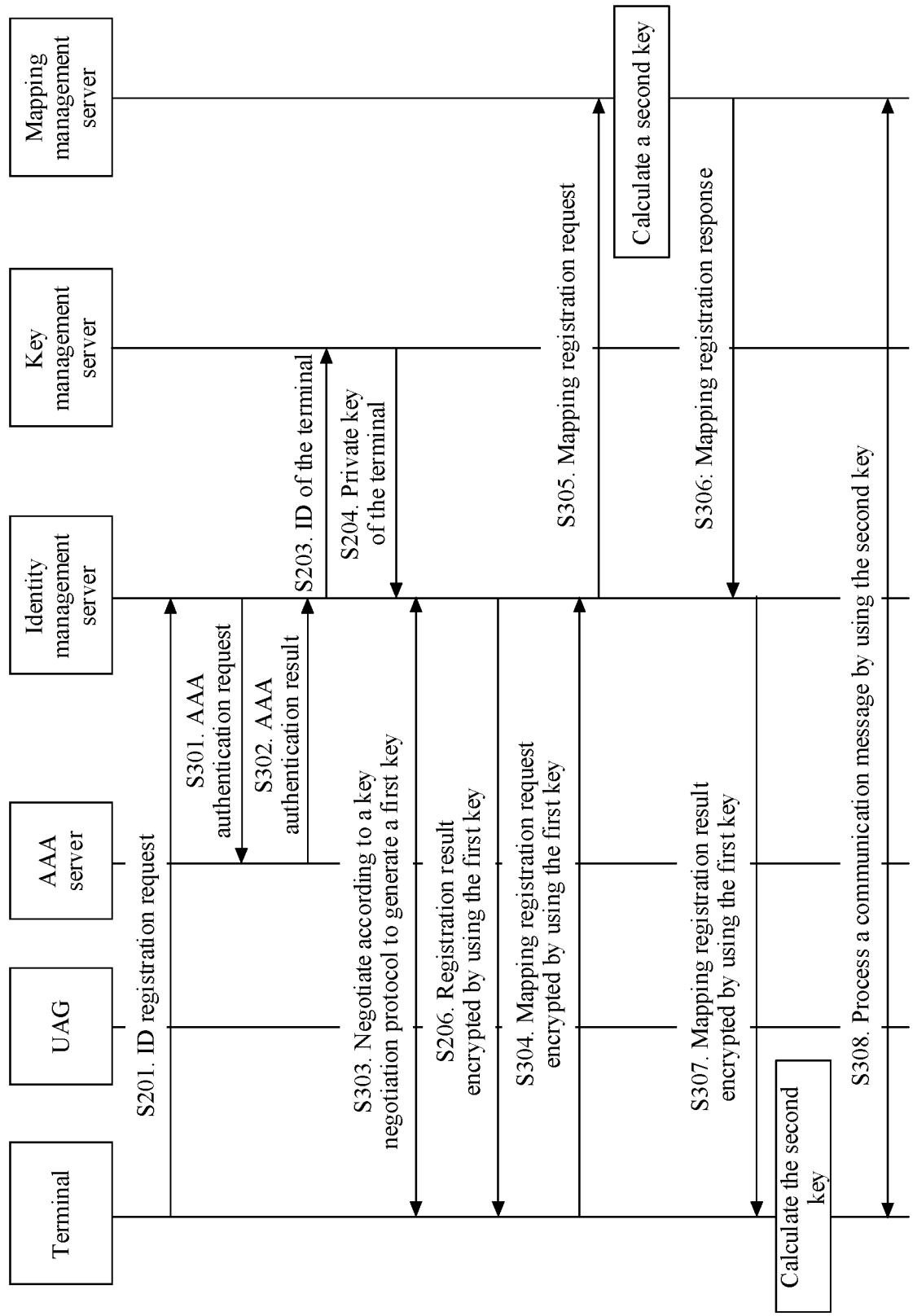
FIG. 3 is a schematic flowchart of Embodiment 2 of a key distribution method according to this application.

FIG. 3 is a schematic flowchart of Embodiment 2 of a key distribution method according to this application. As shown in FIG. 3, in the key distribution method provided in the embodiment, based on the embodiment shown in FIG. 2, S202 specifically includes the following steps.

S301. The identity management server sends the AAA authentication information of the terminal to the AAA server, and requests the AAA server to determine whether the AAA authentication on the terminal succeeds. The AAA authentication information is the AAA authentication information of the terminal that is included in the ID registration request message sent by the terminal in S201.

S302. The AAA server determines, based on the AAA authentication information, whether the AAA authentication on the terminal succeeds, and sends the AAA authentication result to the identity management server. The authentication result may be one of two results: authenticated or unauthenticated. Therefore, after determining that the AAA authentication on the terminal succeeds, the identity management server sends the ID of the terminal to the key management server.

S303 is a possible implementation of S204. In S303, the identity management server and the terminal may negotiate according to a key negotiation protocol to generate the first key. The key negotiation protocol includes a DH protocol, an IKE protocol, and the like. This may be not limited herein.

As shown in FIG. 3, after obtaining the private key from the identity management server, the terminal further needs to negotiate with the mapping management server to determine a second key used when the terminal and the mapping management server communicate with each other. The mapping management server is configured to provide the terminal with the ID-locator mapping query service. To ensure security performance of interaction information in the ID-locator mapping query service, after completing the registration with the identity management server, the terminal sends the mapping registration request to the mapping management server to request the mapping management server to register the terminal and negotiate with the terminal for the second key used in the communication between the terminal and the mapping management server. The second key is used to encrypt a communication message between the terminal and the mapping management server. Optionally, the mapping registration request may be encrypted by using the first key and first be sent to the identity management server, to ensure communication security of the mapping registration request. Specifically, after S205, the following steps are further included.

S304. The terminal sends the mapping registration request to the identity management server, to request the mapping management server to register the terminal. The mapping registration request message includes the ID of the terminal, a location of the terminal, and a first random number generated by the terminal. The mapping registration request message is encrypted by using the first key. The mapping management server provides the terminal with the ID-locator mapping query service.

S305. The identity management server receives the mapping registration request message, decrypts the mapping registration request message by using the first key, and sends the decrypted mapping registration request message to the mapping management server.

S306. The mapping management server receives the mapping registration request message and generates a second random number, and obtains the second key through calculation based on the first random number, the second random number, the ID of the terminal, and an ID of the mapping management server. The second key is used to encrypt a communication message between the terminal and the mapping management server. In other words, when the terminal and the mapping management server communicate with each other, one party encrypts all messages by using the second key and then sends the messages to the other party, and after receiving the messages from the party, the other party decrypts the messages by using the second key. Then, the mapping management server sends the second random number to the identity management server.

S307. The identity management server sends, to the terminal, a mapping registration result encrypted by using the first key. The mapping registration result includes the second random number and the ID of the mapping management server. Therefore, the terminal decrypts the encrypted mapping registration result by using the first key, and obtains the mapping registration result. In addition, the terminal obtains the second key through calculation based on the first random number, the second random number, the ID of the terminal, and the ID of the mapping management server.

S308. After the terminal obtains the second key through calculation, the terminal and the mapping management server separately encrypt and decrypt interactive communication messages by using the second key.

In conclusion, in the key distribution method provided in the embodiment, after the terminal requests the private key from the identity management server, the terminal further requests, by using the identity management server, the mapping management server to register the terminal and to provide the terminal with the service of a mapping query function. In this case, the terminal and the mapping management server negotiate for the second key, to ensure security of a message exchanged between the terminal and the mapping management server. Encryption and decryption are both performed by using the second key, thereby further improving communication security performance when the ID-based registration and authentication are performed on the terminal.

Figure 4:
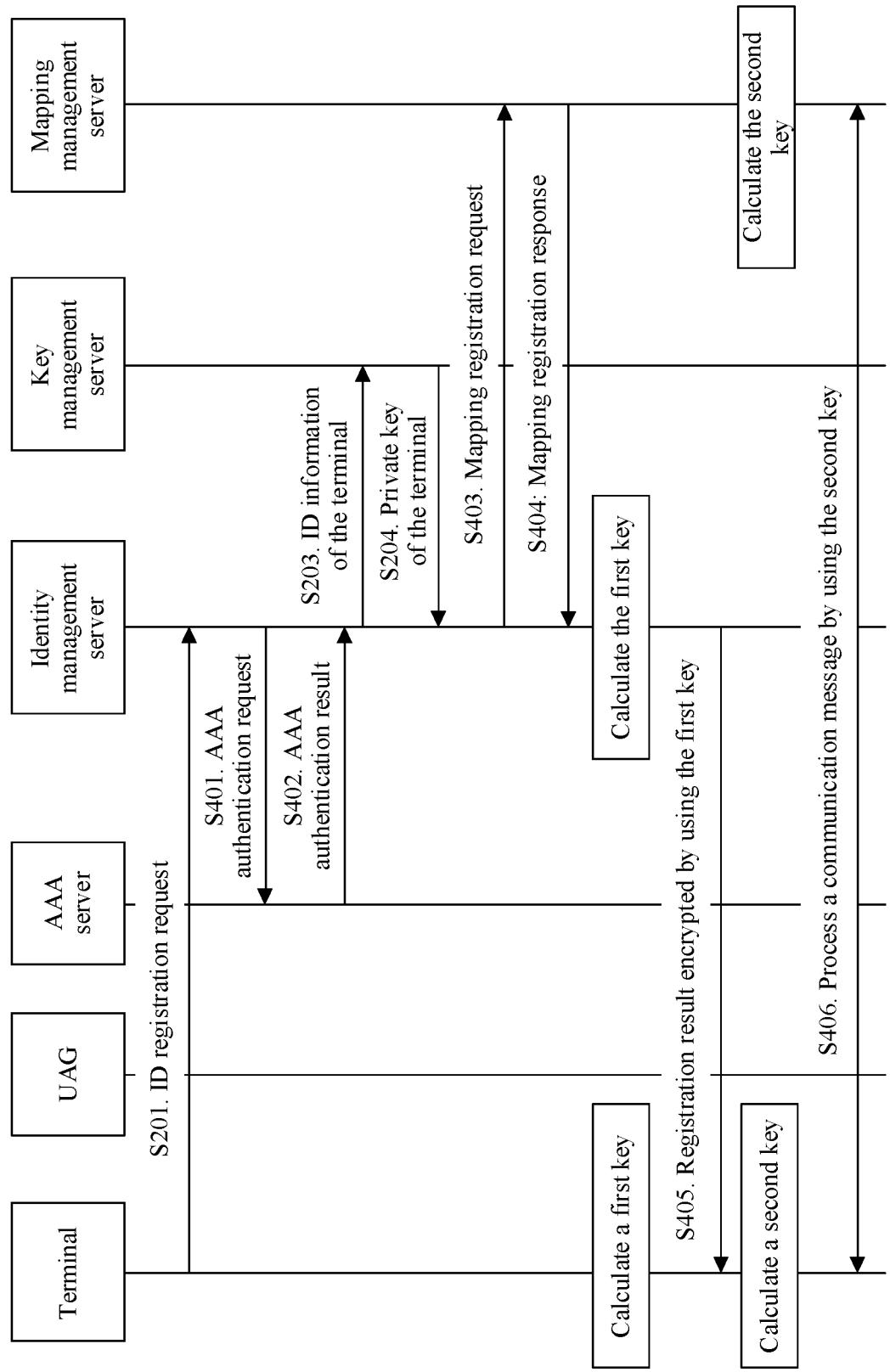
FIG. 4 is a schematic flowchart of Embodiment 3 of a key distribution method according to this application.

FIG. 4 is a schematic flowchart of Embodiment 3 of a key distribution method according to this application. As shown in FIG. 4, in the key distribution method provided in the embodiment, based on the embodiment shown in FIG. 2, S202 specifically includes the following steps.

S401. The identity management server sends the AAA authentication information of the terminal to the AAA server, and requests the AAA server to determine whether the AAA authentication on the terminal succeeds. The AAA authentication information is the AAA authentication information of the terminal that is included in the ID registration request message sent by the terminal in S201.

S402. The AAA server determines, based on the AAA authentication information, whether the AAA authentication on the terminal succeeds, and sends the AAA authentication result to the identity management server. The authentication result may be one of two results: authenticated or unauthenticated. Therefore, after determining that the AAA authentication on the terminal succeeds, the identity management server sends the ID of the terminal to the key management server.

As shown in FIG. 4, in the embodiment, the terminal and the identity management server negotiate for parameter calculation, to generate the first key used when the terminal and the identity management server communicate with each other. Specifically, after S204, the following steps are further included.

S403. The identity management server sends a mapping registration request message to the identity management server, to request the mapping management server to register the terminal. The mapping registration request message includes the ID of the terminal, a locator of the terminal, and a first random number generated by the terminal. The mapping registration request message is encrypted by using the first key. The mapping management server provides the terminal with an ID-IP information mapping query service.

The first random number generated by the terminal is sent by the terminal to the identity management server by using the ID registration request message.

S404. The mapping management server establishes a mapping relationship between the ID of the terminal and the locator of the terminal, generates a second random number, and sends the second random number to the identity management server.

After S404 and before S405, the identity management server and the terminal generate the first key through calculation based on the first random number, the ID of the terminal, and the ID of the identity management server.

In S405, a registration result sent by the identity management server to the terminal further includes the first random number, the second random number, and an ID of the mapping management server. Therefore, the terminal and the mapping management server generate the second key through calculation based on the first random number, the second random number, the ID of the terminal, and the ID of the mapping management server. The second key is used to encrypt a communication message between the terminal and the mapping management server. In other words, when the terminal and the mapping management server communicate with each other, one party encrypts all messages by using the second key and then sends the messages to the other party, and after receiving the messages from the party, the other party decrypts the messages by using the second key.

Then, in S406, after the terminal obtains the second key through calculation, the terminal and the mapping management server separately encrypt and decrypt interactive communication messages by using the second key.

In conclusion, in the key distribution method provided in the embodiment, after the terminal requests the private key from the identity management server, the terminal further requests, by using the identity management server, the mapping management server to register the terminal and to provide the terminal with the service of a mapping query function. In this case, the terminal and the mapping management server negotiate for parameter calculation of the second key, to ensure security of a message exchanged between the terminal and the mapping management server. Encryption and decryption are both performed by using the second key, thereby further improving communication security performance when the ID-based registration and authentication are performed on the terminal.

Figure 5:
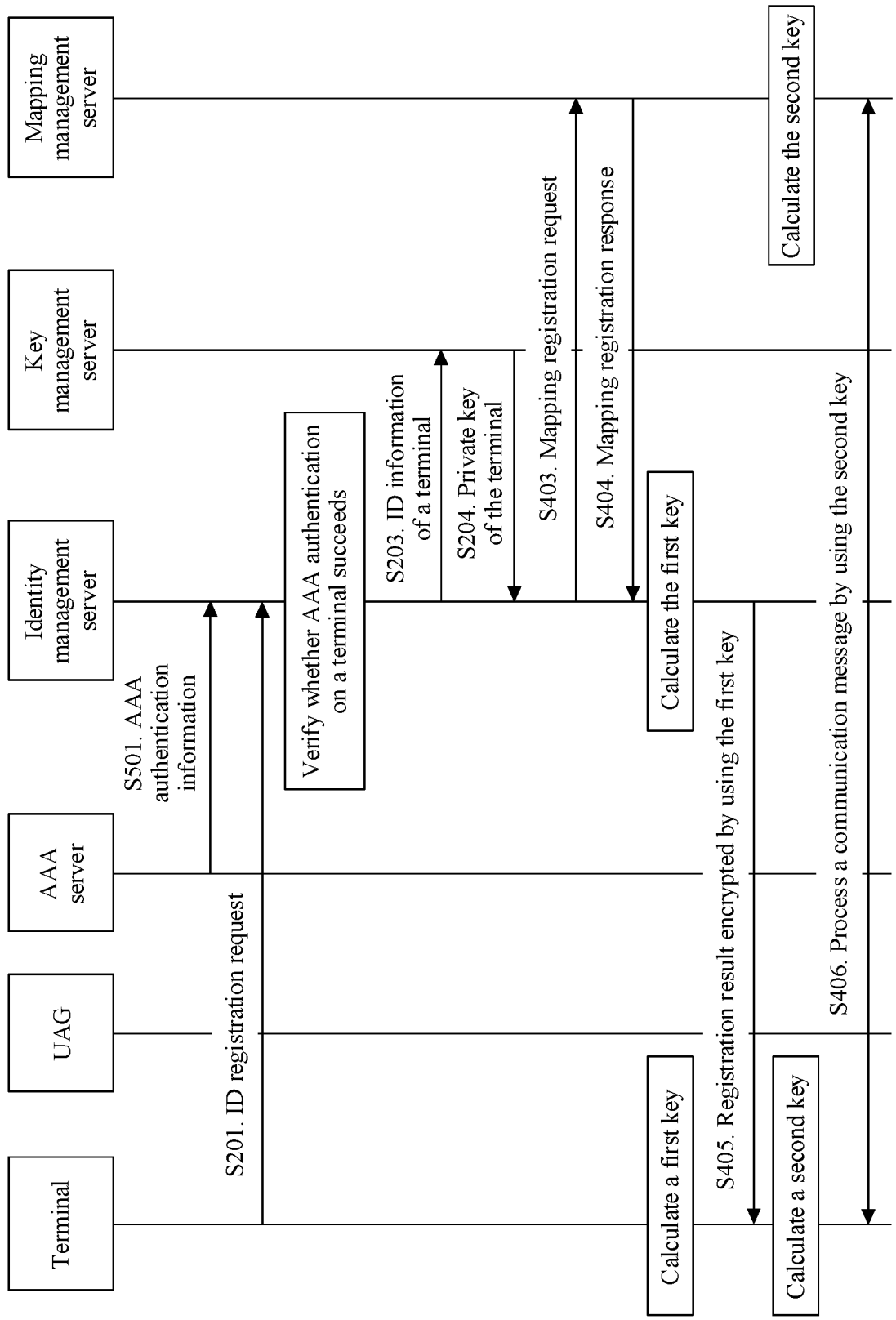
FIG. 5 is a schematic flowchart of Embodiment 4 of a key distribution method according to this application.

FIG. 5 is a schematic flowchart of Embodiment 4 of a key distribution method according to this application. As shown in FIG. 5, based on the embodiments shown in FIG. 2 and FIG. 4, before S201, the key distribution method provided in the embodiment further includes the following steps.

S501. The identity management server receives the AAA authentication information of the terminal that is sent by the AAA server.

Specifically, after the terminal accesses the UAG, the UAG detects the access of the terminal, and sends an AAA authentication request to the AAA server to request the AAA server to authenticate the terminal. After authenticating the terminal, the AAA server returns the AAA authentication information to the terminal by using the UAG. The UAG also sends, to the identity management server, the AAA authentication information returned by the AAA server.

After the identity management server receives the ID registration request message that includes the AAA authentication information of the terminal and that is sent by the terminal, S202 in FIG. 2 specifically includes that the identity management server determines whether the AAA authentication information of the terminal that is sent by the AAA server is the same as the AAA authentication information included in the registration and authentication request message sent by the terminal; and if the AAA authentication information of the terminal that is sent by the AAA server is the same as the AAA authentication information included in the registration and authentication request message sent by the terminal, determines that the AAA authentication on the terminal succeeds.

Figure 6:
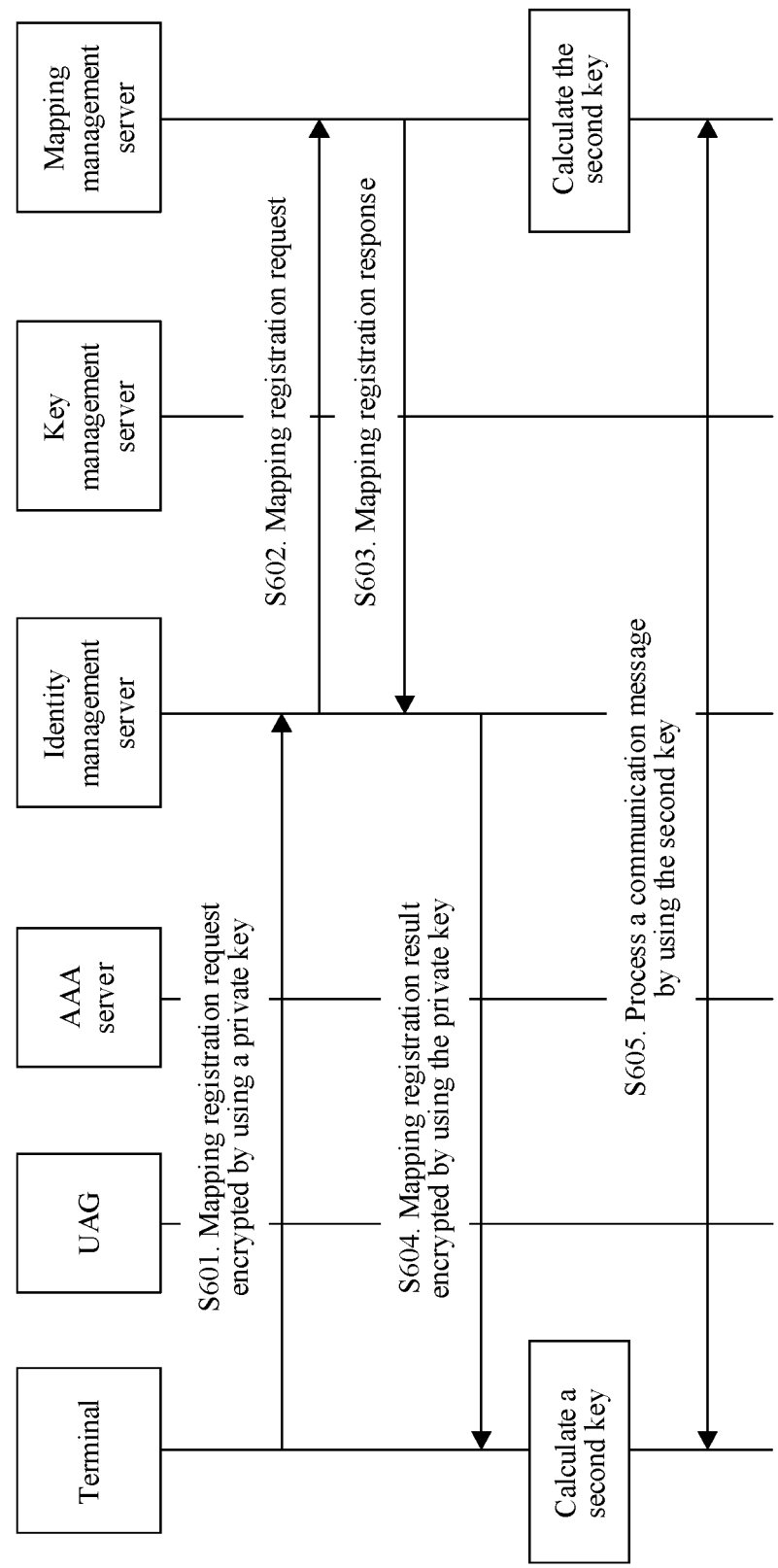
FIG. 6 is a schematic flowchart of Embodiment 5 of a key distribution method according to this application.

Further, in the foregoing embodiments, when the terminal passes the authentication and registration of the identity management server but the terminal needs to request registration and authentication of the mapping management server again; or when the second key used between the terminal and the mapping management server is invalid, the AAA authentication does not need to be performed on the terminal, and only fast registration and authentication based on the ID of the terminal need to be performed. Specifically, FIG. 6 is a schematic flowchart of Embodiment 5 of a key distribution method according to this application. As shown in FIG. 6, the key distribution method provided in the embodiment specifically includes the following steps.

S601. The terminal sends, to the identity management server, a mapping registration request message. The mapping registration request message is used to request the mapping management server to register the terminal. The mapping registration request message includes the ID of the terminal, a locator of the terminal, and a first random number encrypted by using an ID of the identity management server. The mapping registration request message is signed by using the private key of the terminal.

S602. The identity management server receives the mapping registration request message; verifies, by using the ID of the terminal, a signature obtained by using the private key of the terminal; obtains the first random number through decryption by using a private key of the identity management server; and sends a mapping authentication request message to the mapping management server S603. The mapping management server establishes a mapping relationship between the ID of the terminal and the locator of the terminal, generates a second random number, and sends the second random number to the identity management server.

S604. The identity management server receives the second random number that is signed by using a private key and encrypted by using the ID of the terminal and that is sent by the mapping management server.

S605. The terminal receives the encrypted second random number and obtains the second random number through decryption by using the private key of the terminal, and verifies, based on the ID of the identity management server, the signature obtained by using the private key of the identity management server. The terminal and the mapping management server generate the second key through calculation based on the first random number, the second random number, the ID of the terminal, and the ID of the mapping management server. The second key is used to encrypt a communication message between the terminal and the mapping management server.

In conclusion, in the key distribution method in the embodiment provided in this embodiment, when the ID of the terminal has been registered, only authentication based on the ID of the terminal is performed when authentication is performed on the terminal subsequently, instead of performing the AAA authentication on the terminal again, thereby simplifying a process of authenticating the terminal.

Figure 7A:
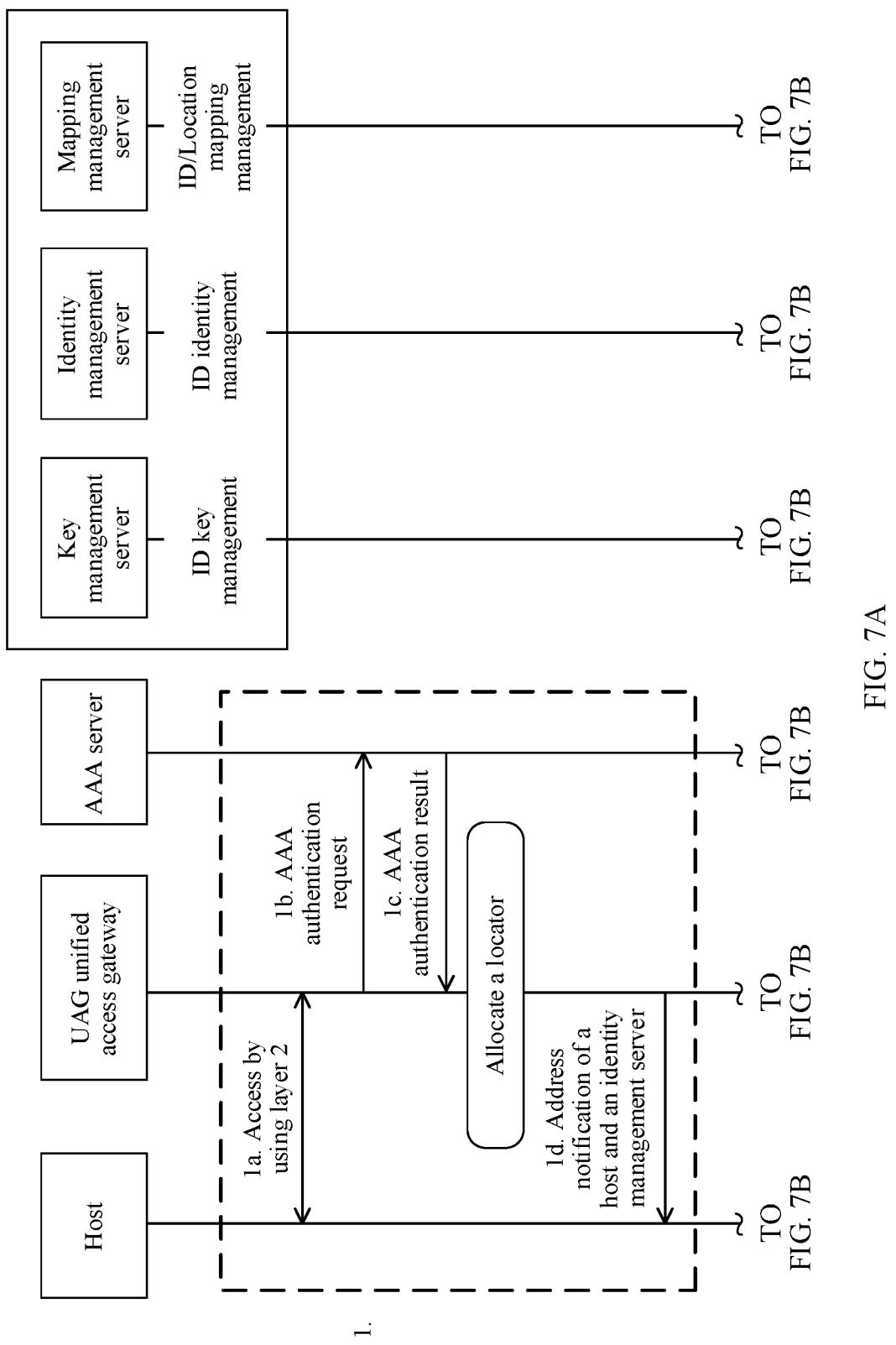
FIG. 7A to FIG. 7C are a schematic flowchart of Embodiment 6 of a key distribution method according to this application.
Figure 7B:
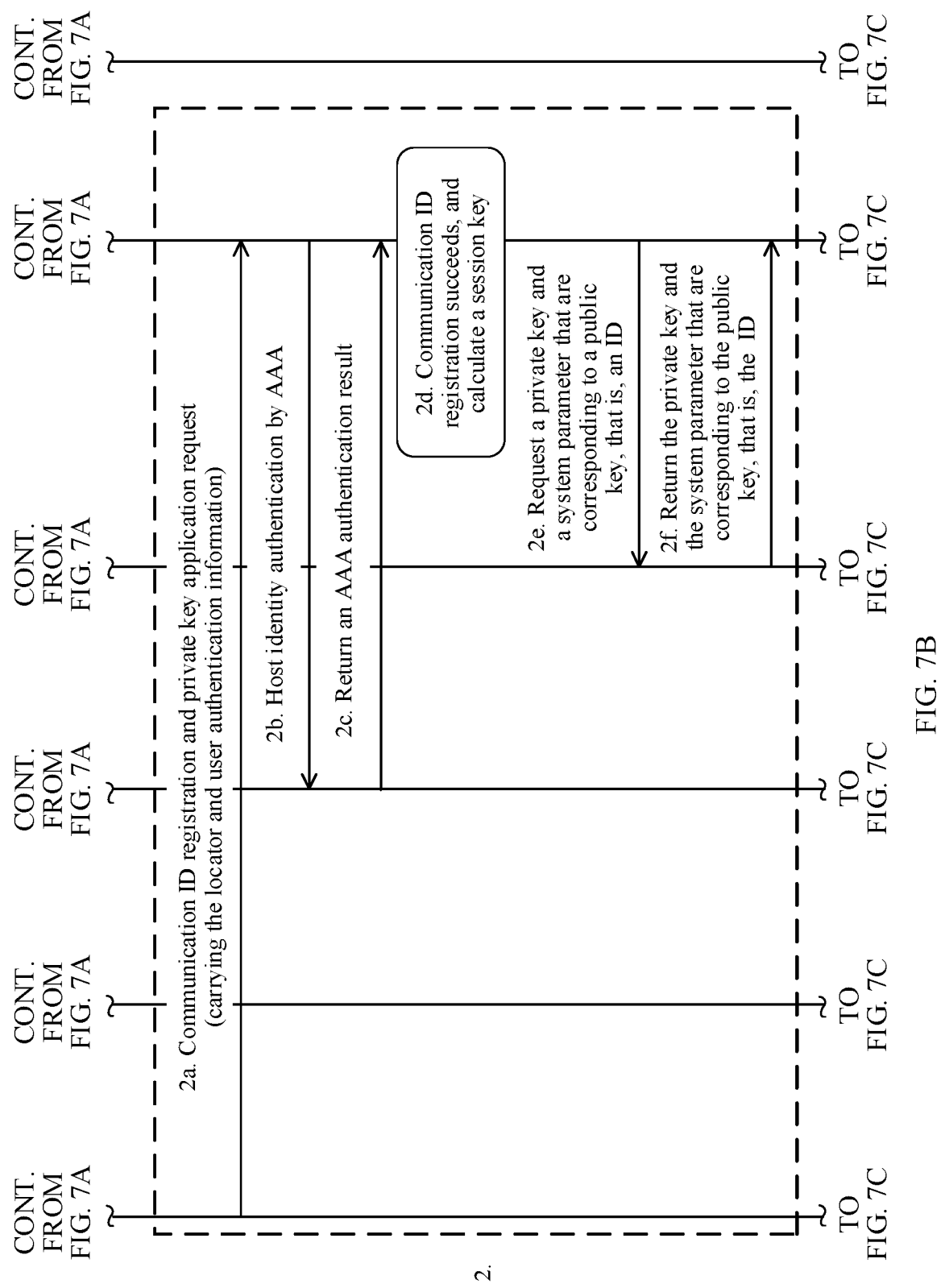
Figure 7C:
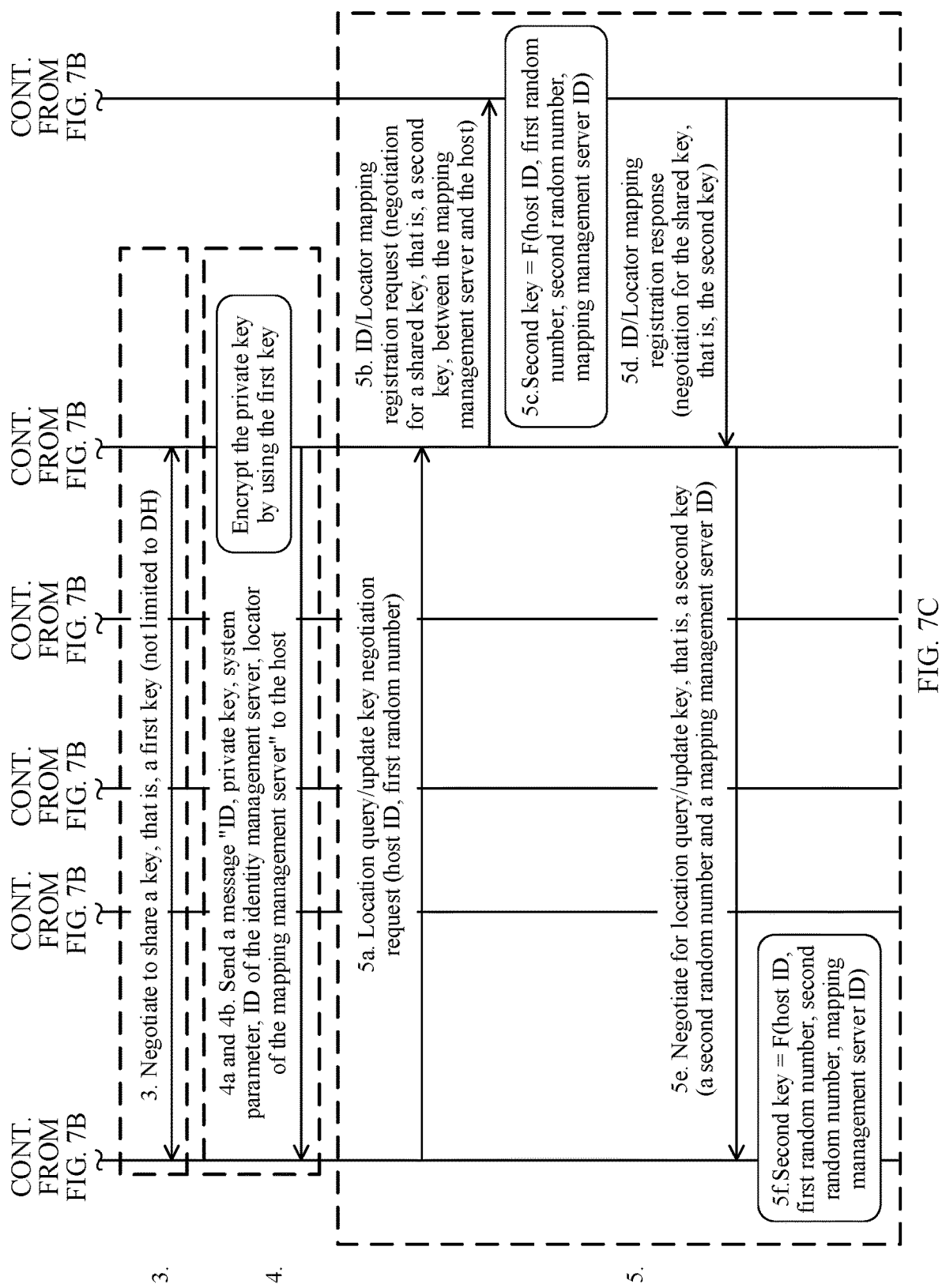
Figure 8A:
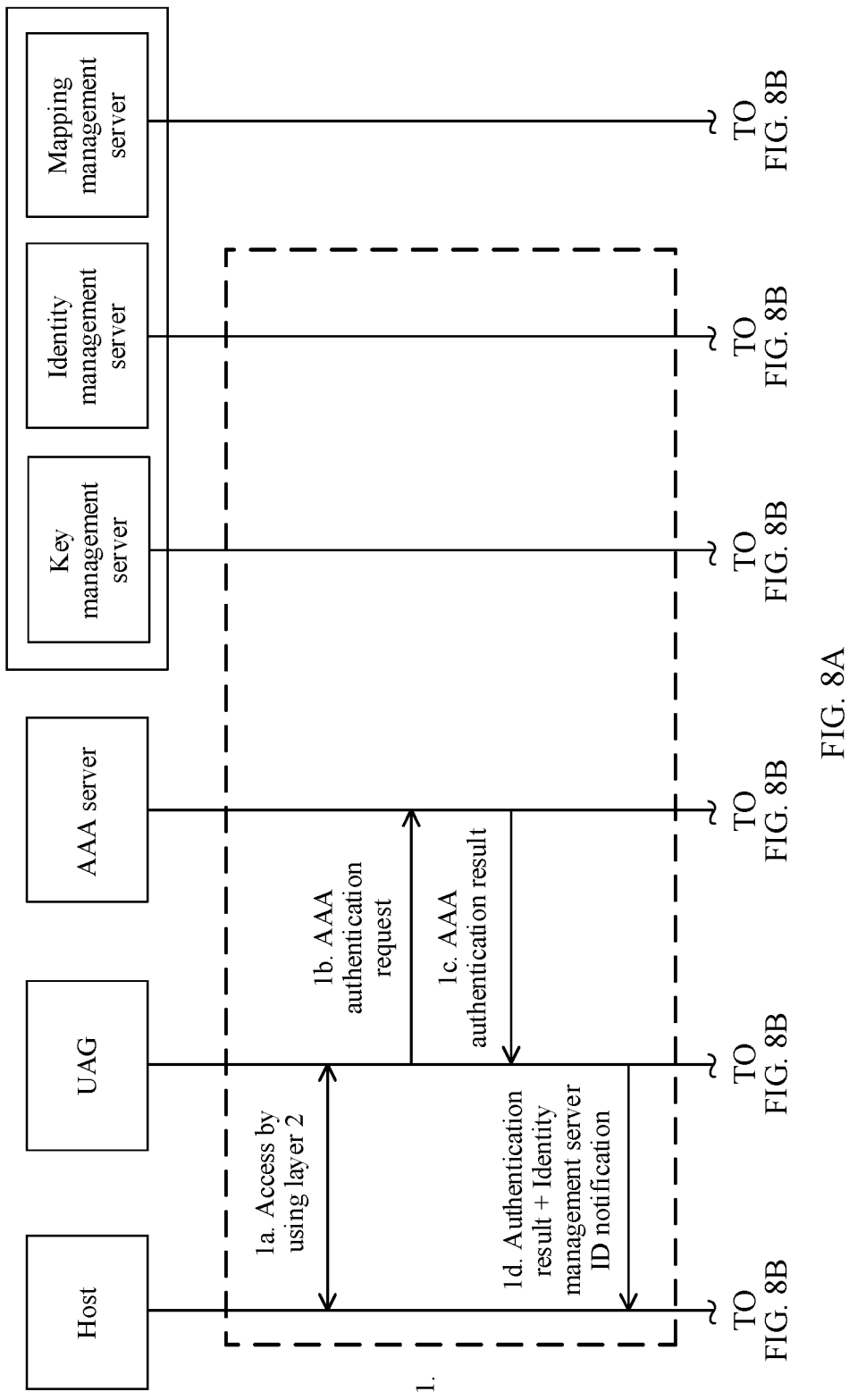
FIG. 8A to FIG. 8D are a schematic flowchart of Embodiment 7 of a key distribution method according to this application.
Figure 8B:
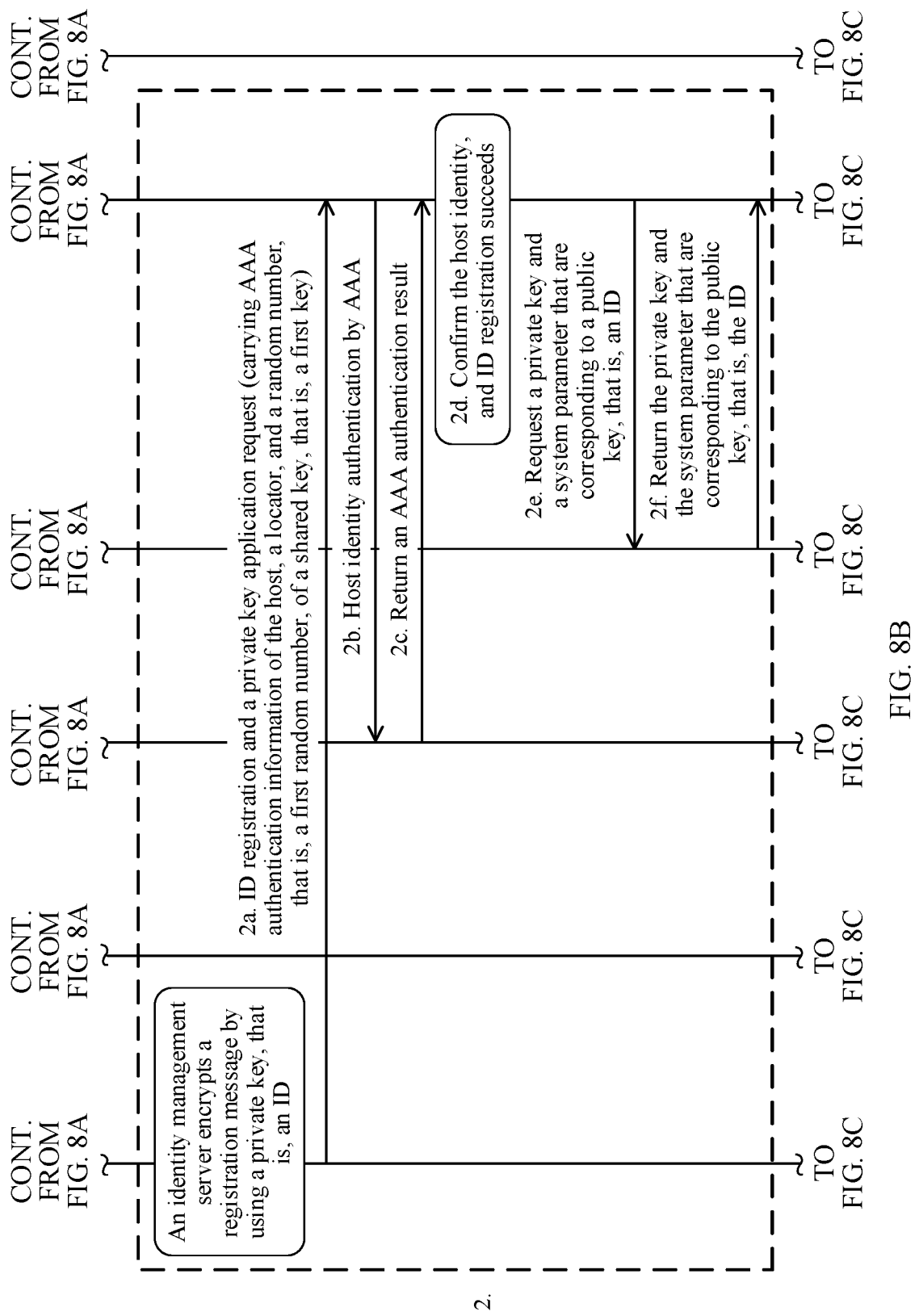
Figure 8C:
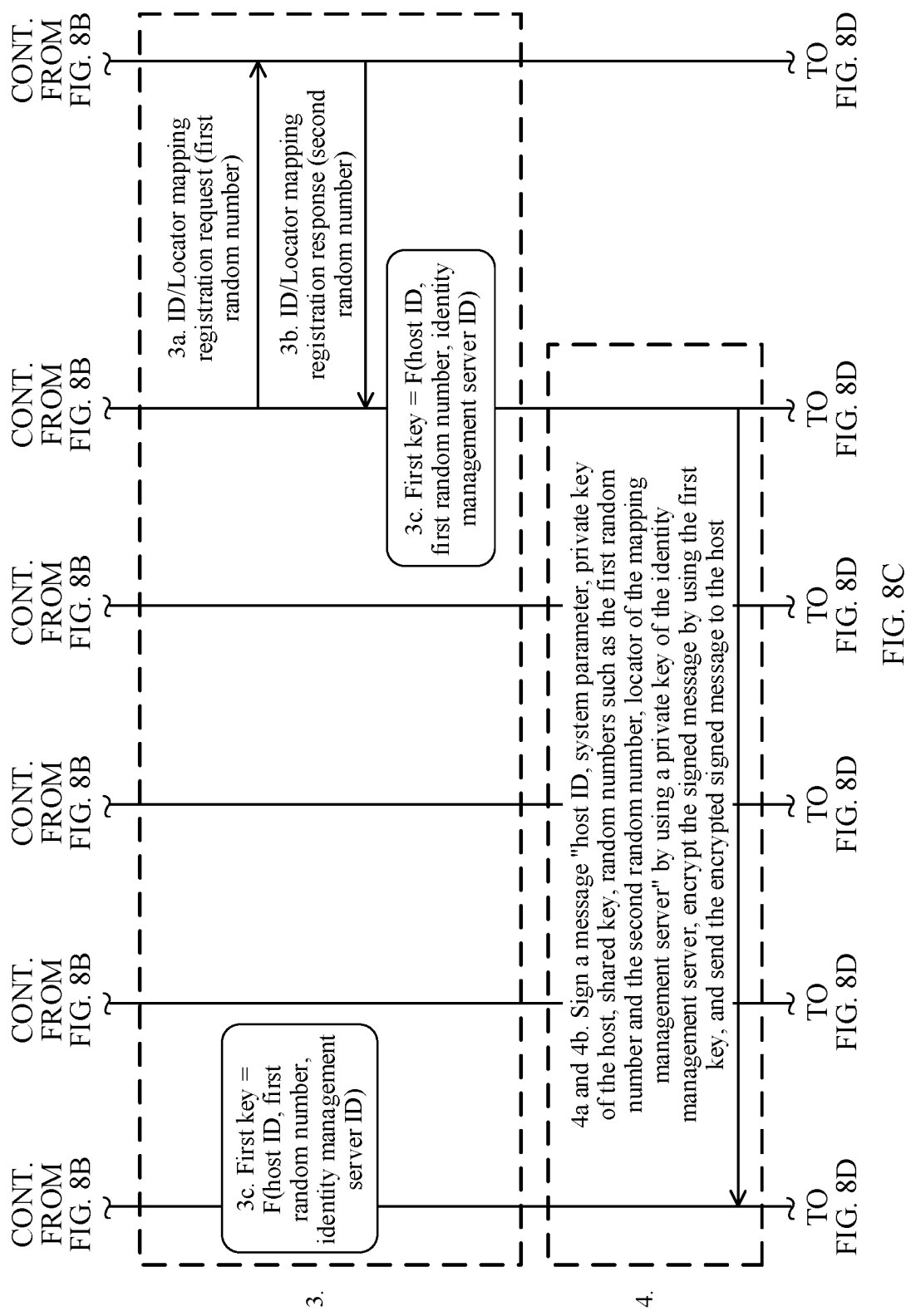
Figure 8D:
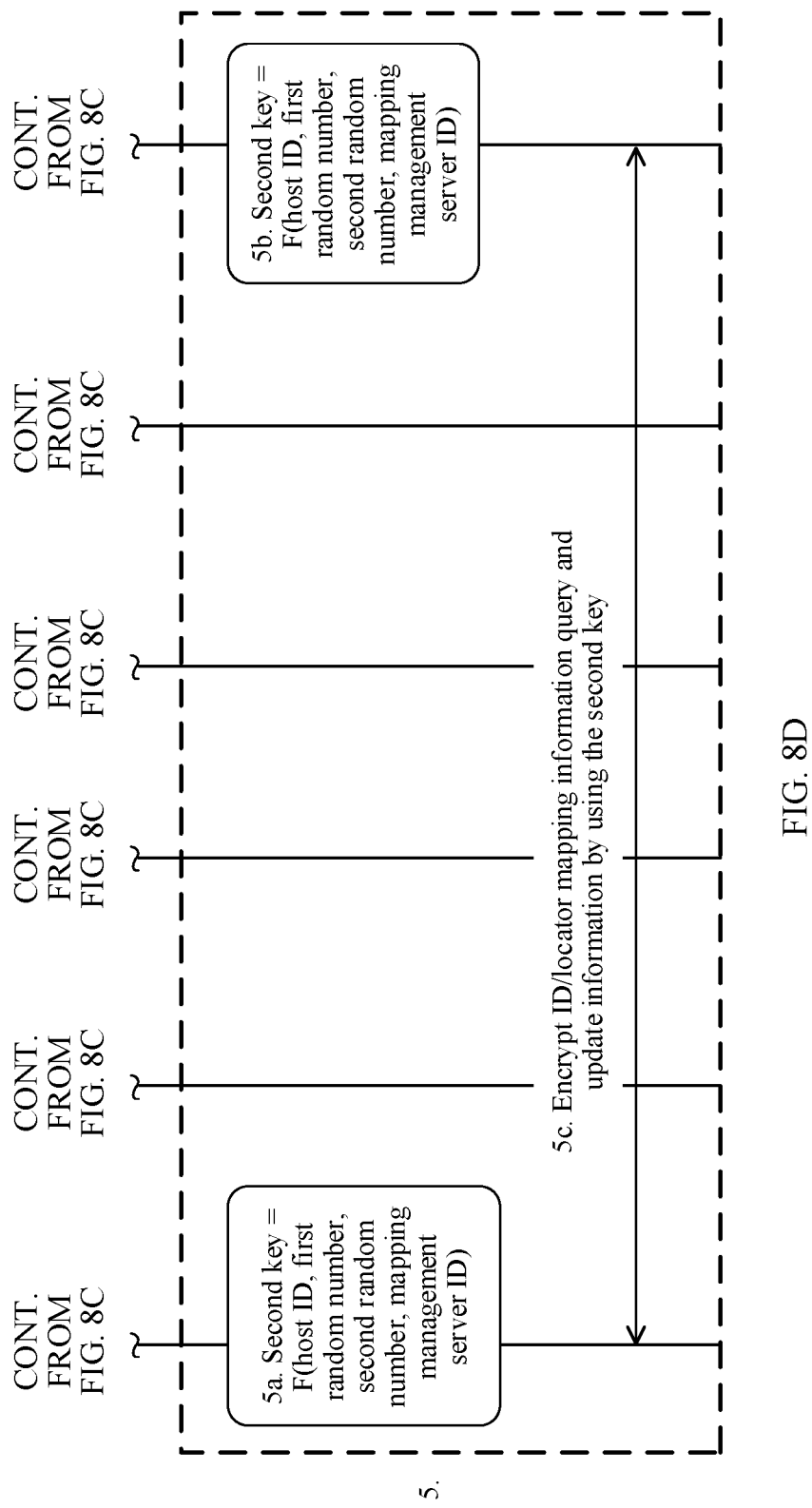
Figure 9A:
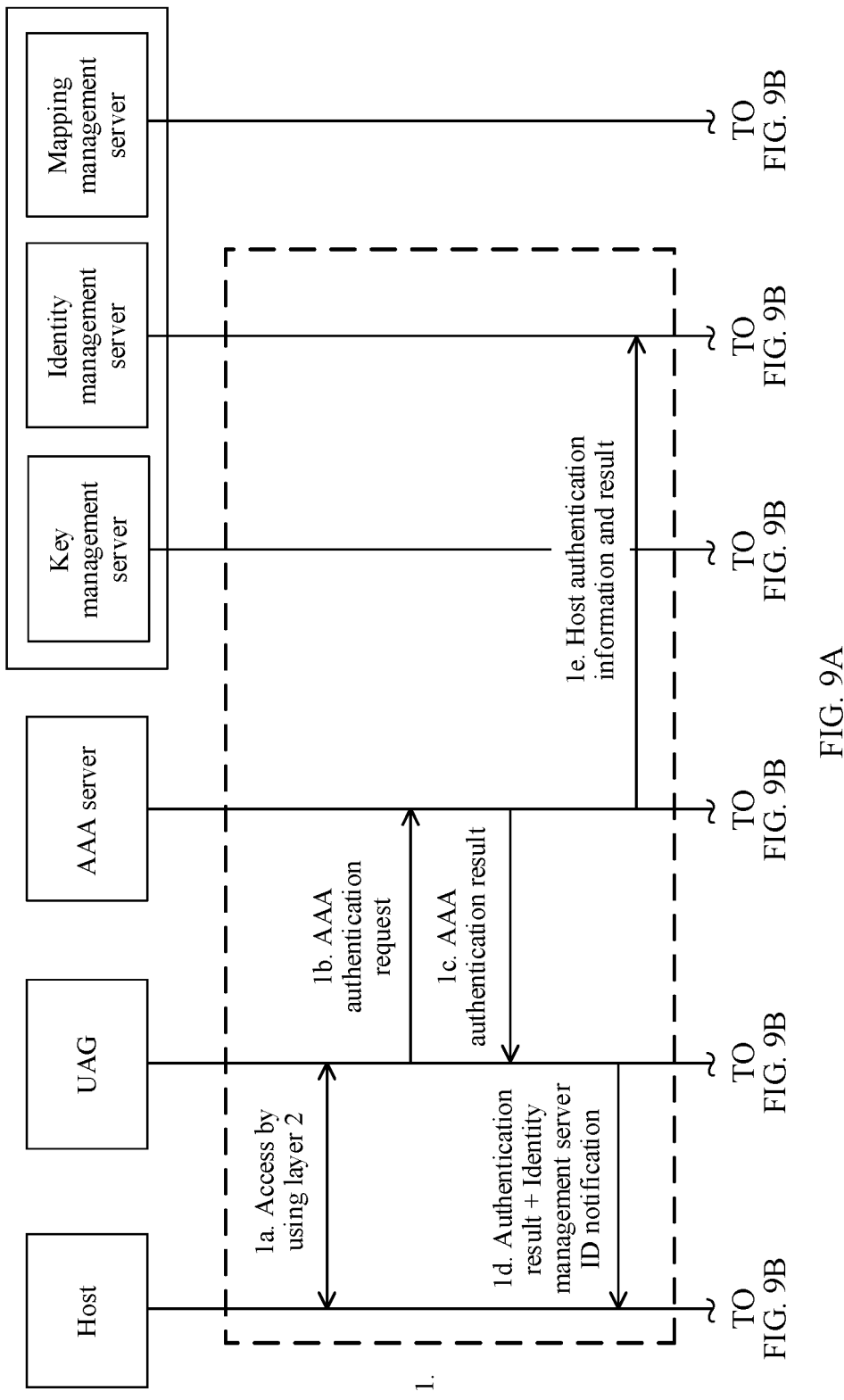
Figure 9B:
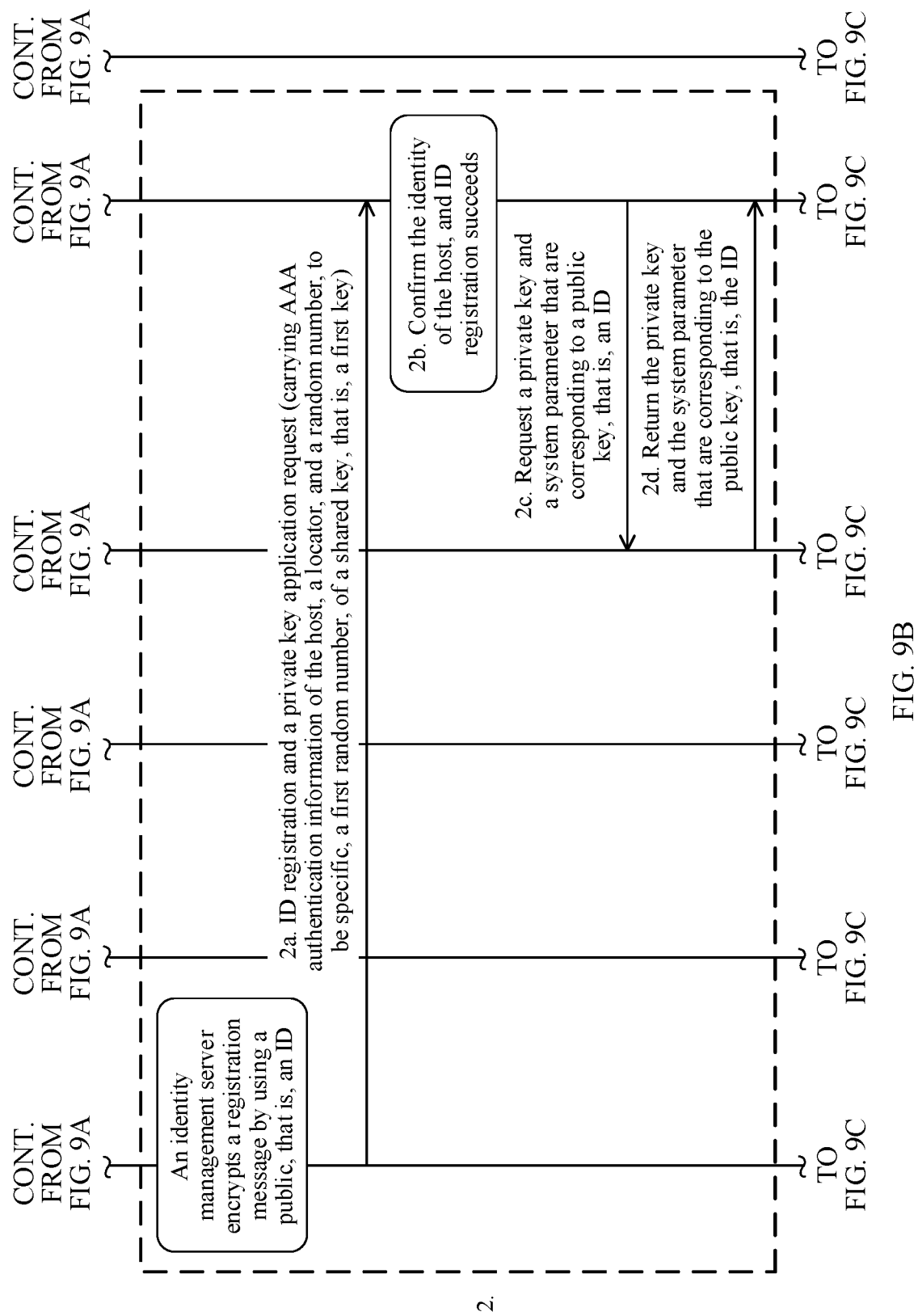
Figure 9C:
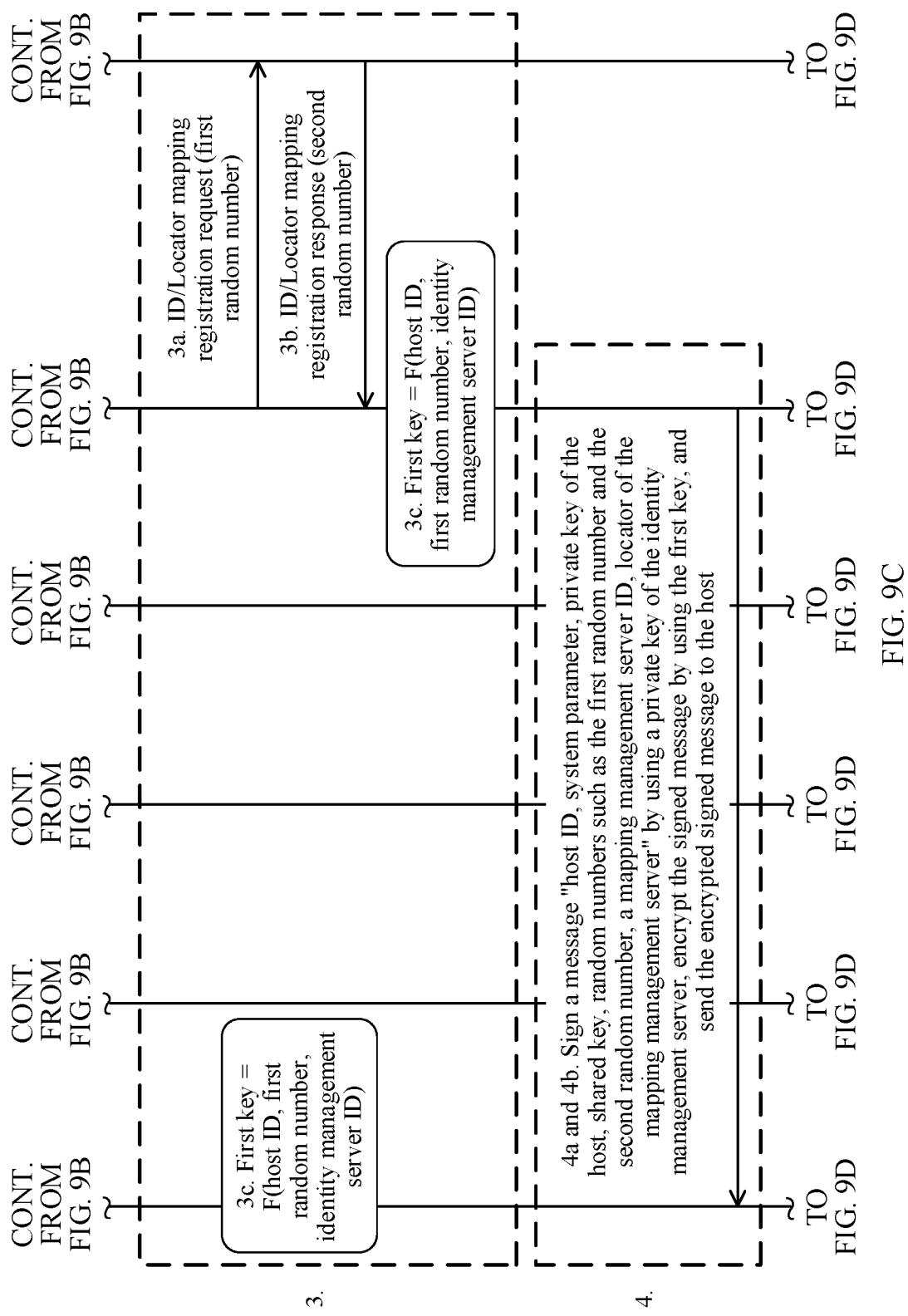

FIG. 7A to FIG. 7C are a schematic flowchart of Embodiment 6 of a key distribution method according to this application. The key distribution method shown in FIG. 7A to FIG. 7C in this application is based on the embodiment of FIG. 3. The terminal is a communications entity host Host, the identity management server is an ID management system or an ID management server IDMS in a GRIDS system, the mapping management server is a mapping system or a mapping server NMS in the GRIDS, and the key management server may be an identity key management system IKMS in the GRIDS. After the communication entity host accesses the unified access gateway UAG, the UAG requests the AAA server to perform AAA authentication on the host and to allocate an IP address to the host. After accessing a network, the host sends an ID-based registration request to the IDMS. The request includes AAA authentication information. After receiving the request, the IDMS first verifies an identity of the host for the AAA server. If the authentication succeeds, the IDMS responds to the request, allocates an ID to the host, and sends the ID of the host to the IKMS, so that the IKMS generates a private key of the host based on an IBC technology by using the ID of the host as a public key. After the IDMS and the host negotiate to determine a first key for communication between the IDMS and the host, the IDMS sends, to the host, the ID and the private key of the host that are encrypted by using the first key. Then, the host sends a mapping registration request message to the IDMS, so that the IDMS requests the NMS to register the host for a mapping service. After registering the host based on the mapping registration request message, the NMS sends a random number, and the NMS and the host calculate a second key of communication between the NMS and the host by using a common parameter. Therefore, the second key is used for encryption processing and decryption processing on information exchanged between the NMS and the host, when the NMS and the host use the second key to conduct a locator-ID mapping query or update service.

Specifically, as shown in FIG. 7A to FIG. 7C, the key distribution method in the embodiment includes the following steps.

Step 1a: The host accesses a network, and accesses the unified access gateway UAG by using layer 2.

Step 1b: The UAG initiates the authentication request to the AAA server, to request the AAA server to perform AAA authentication on the host accessing the UAG.

Step 1c: The AAA server performs, based on an AAA authentication mechanism, authentication on the host that the UAG requests to authenticate, and returns an AAA authentication result, that is, AAA authentication information of the host to the UAG. The authentication mechanism may be a mechanism based on a subscriber identifier and a password, or a hash challenge/response authentication mechanism for a password.

Step 1d: After verifying the AAA authentication result of the host, the UAG allocates IP information to the host, and sends the IP information of the host and IP information of the IDMS to the host in a notification manner. The IP information may be an IP address of the host.

Step 2a: After completing the foregoing steps, the host accesses the network. The host may register with the IDMS by using the UAG, and request an ID-based service. The host sends a host authentication request message to the IDMS. The host authentication request message is used by the host to request the IDMS to perform ID-based registration and authentication on the host. The host authentication request message carries the IP information and the AAA authentication information of the host.

Step 2b: After receiving the host authentication request message sent by the host, the IDMS first verifies whether the host passes the authentication of the AAA server, and sends the AAA authentication information of the host in the host authentication request message to the AAA server, so that the AAA server verifies the AAA authentication information.

Step 2c: If the authentication succeeds, the identity of the host is confirmed, and the AAA authentication result is returned to the IDMS. In this case, step 2e is performed. If the verification fails, the identity of the host is not confirmed. In this case, step 2d is performed.

Step 2d: The IDMS sends a verification failure message to the host.

Step 2e: The IDMS sends the ID of the host to the IKMS, and requests the IKMS to allocate the private key of the host.

Step 2f: The IKMS generates the private key of the host based on an identity-based cryptography (Identity Based Cryptography, IBC for short) technology by using the ID of the host as a public key, and sends a system parameter of the IKMS and the private key of the host to the IDMS.

Step 3: The IDMS and the host negotiate to obtain the first key SK1, to establish a secure channel for distributing the private key used between the IDMS and the host. The manner of obtaining through negotiation may be a key negotiation DH protocol.

Step 4a: The IDMS sends, to the host, a registration and authentication result that is encrypted by using the first key. The registration and authentication result may include the ID of the host, the private key of the host, a system parameter, an ID of the NMS, IP information of the NMS, the ID of the IDMS, and the like.

Step 4b: After the host receives and decrypts the encrypted registration and authentication result, the ID-based registration and authentication of the host are completed.

Optionally, after the ID-based registration and authentication of the host are completed, the host and the mapping management server may negotiate for the second key, to perform registration and authentication in the NMS. The host is provided with an ID-IP information mapping query service by using the NMS. Details are as follows:

Step 5a: The host sends a mapping authentication request message to the IDMS. The mapping authentication request message is used to request the NMS to determine the second key, and request to register a mapping relationship for the host. The mapping authentication request message is encrypted by using the first key. The mapping authentication request message includes the ID of the host, the IP information of the host, and the first random number.

Step 5b: After decrypting the encrypted mapping authentication request message by using the first key, the IDMS responds to the mapping authentication request message, and forwards the mapping authentication request message to the NMS.

Step 5c: The NMS establishes a mapping relationship between the IP and the ID of the host based on the mapping authentication request message, and generates a second random number. The NMS generates the second key SK2 through calculation based on the first random number Nonce 1, the second random number Nonce 2, the ID of the host, and the ID of the NMS by using SK2=F(HostID, Nonce 1, Nonce 2, NMS_ID). For example, SK2=HostID+Nonce 1+Nonce 2+NMS_ID. Alternatively, the NMS may further implement calculation of the second key in a hash manner or another calculation manner. This is not specifically limited herein.

Step 5d: The NMS sends a mapping registration result to the IDMS. The mapping registration result includes the second random number and the mapping relationship between the IP and the ID of the host.

Step 5e: The IDMS encrypts the mapping registration result by using the first key, then sends the encrypted mapping registration result to the host.

Step 5f: The host receives the encrypted mapping registration result and decrypts the encrypted mapping registration result by using the first key. Then, the host generates the second key through calculation based on the first random number Nonce 1, the second random number Nonce 2, the ID of the host, and the ID of the NMS by using SK2=F (HostID, Nonce 1, Nonce 2, NMS_ID). In this way, both the host and the NMS obtain the second key. When updating and a query for an IP and an ID are subsequently performed in communication between the host and the mapping server, the host and the mapping management server separately perform encryption and decryption on exchanged messages by using the second key.

In the embodiment, information exchanged between the host and the IDMS is encrypted by using the first key obtained after negotiation between the host and the IDMS, and information exchanged between the host and the NMS is further encrypted by using the second key obtained after negotiation between the host and the NMS, thereby ensuring security performance in an information transmission process, simplifying an authentication procedure, and ensuring secure information transmission during ID-based host authentication.

FIG. 8A to FIG. 8D are a schematic flowchart of Embodiment 7 of a key distribution method according to this application. The key distribution method shown in FIG. 8A to FIG. 8D in this application is based on the embodiment of FIG. 4. The terminal is a communications entity host Host, the identity management server is an ID management system or an ID management server IDMS in a GRIDS system, the mapping management server is a mapping system or a mapping server NMS in the GRIDS, and the key management server may be an identity key management system IKMS in the GRIDS. After the host accesses the unified access gateway UAG, the UAG requests the AAA server to perform AAA authentication on the host and to allocate an IP address to the host. The UAG further provides the host with an ID and AAA authentication information of the IDMS. After accessing the network, the host sends an ID-based registration request to the IDMS. The request carries a first random number. After receiving the request, the IDMS first sends the AAA authentication information of the host to the AAA server to verify an identity of the host. If the authentication succeeds, the IDMS responds to the request, allocates an ID to the host, and sends the ID of the host to the IKMS, so that the IKMS generates a private key of the host based on an IBC technology by using the ID of the host as a public key and generates a second parameter. The IDMS and the host determine a first key for communication between the IDMS and the host in a parameter calculation manner. Parameters required for the parameter calculation include the first random number, a second random number, and the ID of the IDMS. Then, the IDMS sends, to the host, the private key of the host and the second parameter that are encrypted by using the first key. Then, the host and the NMS calculate a second key for communication between the host and the NMS in a parameter calculation manner by using a common parameter. Parameters required for the parameter calculation include the first random number, the second random number, the ID of the host, and the ID of the IDMS. Therefore, when the NMS and the host perform the mapping query between IP information and an ID or an update service, encryption processing and decryption processing are performed by using the second key on information exchanged between the NMS and the host.

Specifically, as shown in FIG. 3, the ID-based host authentication method in the embodiment includes the following steps. Step 1a: When the host needs to access a network, the host accesses the unified access gateway UAG by using layer 2.

Step 1b: The UAG initiates the authentication request to the AAA server, to request the AAA server to perform AAA authentication on the host accessing the UAG.

Step 1c: The AAA server performs, based on an AAA authentication mechanism, authentication on the host that the UAG requests to authenticate, and returns an AAA authentication result of the host to the UAG. The authentication mechanism may be a mechanism based on a subscriber identifier and a password, or a hash challenge/response authentication mechanism for a password.

Step 1d: After verifying the AAA authentication result of the host, the UAG allocates an IP to the host, and sends the IP information of the host and an IDMS ID to the host in a notification manner. The IP may be an IP address of the host.

Step 2a: After completing the foregoing steps, the host accesses the network. The host may register with the IDMS by using the UAG, and request an ID-based service. The host sends a host authentication request message to the IDMS. The host authentication request message is used by the host to request the IDMS to perform ID-based registration and authentication on the host. The host authentication request message carries the IP and the AAA authentication information of the host. The host authentication request message further includes a first random number encrypted by using the IDMS ID.

Step 2b: After receiving the host authentication request message sent by the host, the IDMS obtains the first random number through decryption by using a private key of the IDMS, verifies whether the host passes the authentication of the AAA server, and sends the AAA authentication information of the host in the host authentication request message to the AAA server, so that the AAA server verifies the AAA authentication information.

Step 2c: If the authentication succeeds, the identity of the host is confirmed, and the AAA authentication result is returned to the IDMS. In this case, step 2e is performed. If the verification fails, the identity of the host is not confirmed. In this case, step 2d is performed.

Step 2d: The IDMS sends a verification failure message to the host.

Step 2e: The IDMS allocates the ID to the host, sends the ID of the host to the IKMS, and requests the IKMS to allocate the private key of the host.

Step 2f: The IKMS generates the private key of the host based on an identity-based cryptography IBC technology by using the ID of the host as a public key, and sends a system parameter of the IKMS and the private key of the host to the IDMS.

Step 3a: The IDMS sends a mapping authentication request message to the NMS. The mapping authentication request message carries the ID of the host, the IP, and a first random number of the host authentication request message.

Step 3b: The NMS establishes a mapping relationship between the IP and the ID of the host based on the mapping authentication request message, generates a second random number, and sends a mapping registration result and the second random number to the IDMS as a response to the mapping authentication request.

Step 3c: The host and the NMS separately obtain the first key through calculation in a preset manner. The host and the NMS may obtain the first key SK1 through calculation based on the first random number Nonce 1, the ID of the host, and the ID of the IDMS by using a function: SK1=F(HostID, Nonce 1, IDMS_ID). For example, a possible calculation manner of the function SK1=F(HostID, Nonce 1, IDMS_ID) is SK1=HostID+Nonce 1+IDMS_ID. Alternatively, the host and the NMS may further implement calculation of the first key in a hash manner or another calculation manner. This is not specifically limited herein.

Step 4a: The IDMS sends, to the host, a registration and authentication result of the host that is encrypted by using the first key and that is signed by using the private key of the IDMS. The registration and authentication result may include a second random number, the ID of the host, the private key of the host, a system parameter, an ID of the NMS, IP information of the NMS, and the like.

Step 4b: After receiving the registration and authentication result, the host performs signature authentication by using the ID of the IDMS, and decrypts the registration and authentication result by using the first key, to complete the ID-based registration and authentication of the host.

Optionally, after the ID-based registration and authentication of the host are completed, the host and the mapping management server may negotiate for the second key, to perform registration and authentication in the NMS. The host is provided with an ID-IP information mapping query service by using the NMS. Details are as follows:

Step 5a: The host calculates a second key based on the ID of the NMS and the second random number that are obtained in step 4. Specifically, the host generates the second key SK2 through calculation by using SK2=F(Host1, Nonce 1, Nonce 2, NMS_ID). For example, SK2=HostID+Nonce 1+Nonce 2+NMS_ID. Alternatively, the host may further implement calculation of the second key in a hash manner or another calculation manner. This is not specifically limited herein.

Step 5b: The NMS also calculates the second key SK2 in the manner in step 5a.

Step 5c: When updating and a query for an IP and an ID are subsequently performed in communication between the host and the mapping server, the host and the mapping server separately perform encryption and decryption on exchanged messages by using the second key.

In the embodiment, information exchanged between the host and the IDMS is encrypted by using the first key obtained after negotiation between the host and the IDMS, and information exchanged between the host and the NMS is further encrypted by using the second key obtained after negotiation between the host and the NMS, thereby ensuring security performance in an information transmission process, simplifying an authentication procedure, and ensuring secure information transmission during ID-based host authentication.

FIG. 9A to FIG. 9D are a schematic flowchart of Embodiment 8 of a key distribution method according to this application. The key distribution method shown in FIG. 9A to FIG. 9D in this application is based on the embodiment of FIG. 5. The terminal is a communications entity host Host, the identity management server is an ID management system or an ID management server IDMS in a GRIDS system, the mapping management server is a mapping system or a mapping server NMS in the GRIDS, and the key management server may be an identity key management system IKMS in the GRIDS. After the host accesses the unified access gateway UAG, the UAG requests the AAA server to perform AAA authentication on the host and to allocate an IP address to the host. The UAG further provides the host with an ID of the IDMS. The AAA server authenticates the host, and then sends AAA authentication information of the host to the IDMS. After accessing the network, the host sends an ID-based registration request to the IDMS. The request carries a first random number and the AAA authentication information. After receiving the request, the IDMS first determines through comparison whether the AAA authentication information sent by the AAA server matches the AAA authentication information sent by the host to verify an identity of the host. If the authentication succeeds, the IDMS responds to the request, allocates an ID to the host, and sends the ID of the host to the IKMS, so that the IKMS generates a private key of the host based on an IBC technology by using the ID of the host as a public key and generates a second parameter. The IDMS and the host determine a first key for communication between the IDMS and the host in a parameter calculation manner. Parameters required for the parameter calculation include the first random number, a second random number, and the ID of the IDMS. Then, the IDMS sends, to the host, the private key of the host and the second parameter that are encrypted by using the first key. Then, the host and the NMS calculate a second key for communication between the host and the NMS in a parameter calculation manner by using a common parameter. Parameters required for the parameter calculation include the first random number, the second random number, the ID of the host, and the ID of the IDMS. Therefore, when the NMS and the host perform the mapping query between IP information and an ID or an update service, encryption processing and decryption processing are performed by using the second key on information exchanged between the NMS and the host.

Specifically, as shown in FIG. 9A to FIG. 9D, the ID-based host authentication method in the embodiment includes the following steps.

Step 1a: When the host needs to access a network, the host accesses the unified access gateway UAG by using layer 2.

Step 1b: The UAG initiates the authentication request to the AAA server, to request the AAA server to perform AAA authentication on the host accessing the UAG.

Step 1c: The AAA server performs, based on an AAA authentication mechanism, authentication on the host that the UAG requests to authenticate, and returns an AAA authentication result of the host to the UAG. The authentication mechanism may be a mechanism based on a subscriber identifier and a password, or a hash challenge/response authentication mechanism for a password.

Step 1d: After verifying the AAA authentication result of the host, the UAG allocates IP information to the host, and sends the IP information of the host and the ID of the IDMS to the host in a notification manner. The IP information may be an IP address of the host.

Step 1e: The AAA server sends the AAA authentication result of the host to the IDMS.

Step 2a: After completing the foregoing steps, the host accesses the network. The host may register with the IDMS by using the UAG, and request an ID-based service. The host sends a host authentication request message to the IDMS. The host authentication request message is used by the host to request the IDMS to perform ID-based registration and authentication on the host. The host authentication request message carries the IP and the AAA authentication information of the host. The host authentication request message further includes a first random number encrypted by using the IDMS ID.

Step 2b: After receiving the host authentication request message sent by the host, the IDMS obtains the first random number through decryption by using a private key of the IDMS, and verifies whether the host passes the authentication of the AAA server. Specifically, the IDMS compares the AAA authentication information carried in the host authentication request message with the AAA authentication result received in step 1e. If the AAA authentication information carried in the host authentication request message is the same as the AAA authentication result received in step 1e, it indicates that the verification succeeds and step 2d is performed. If the AAA authentication information carried in the host authentication request message is different from the AAA authentication result received in step 1e, it indicates that the verification fails, and the IDMS sends a verification failure message to the host.

Step 2c: The IDMS allocates the ID to the host, sends the ID of the host to the IKMS, and requests the IKMS to allocate the private key of the host.

Step 2d: The IKMS generates the private key of the host based on an identity-based cryptography IBC technology by using the ID of the host as a public key, and sends a system parameter of the IKMS and the private key of the host to the IDMS.

Step 3a: The IDMS sends a mapping authentication request message to the NMS. The mapping authentication request message carries the ID of the host, the IP, and a first random number of the host authentication request message.

Step 3b: The NMS establishes a mapping relationship between the IP and the ID of the host based on the mapping authentication request message, generates a second random number, and sends a mapping registration result and the second random number to the IDMS as a response to the mapping authentication request.

Step 3c: The host and the NMS separately obtain the first key through calculation in a preset manner. The host and the NMS may obtain the first key SK1 through calculation based on the first random number Nonce 1, the ID of the host, and the ID of the IDMS by using a function: SK1=F(HostID, Nonce 1, IDMS_ID). For example, a possible calculation manner of the function SK1=F(HostID, Nonce 1, IDMS_ID) is SK1=HostID+Nonce1+IDMS_ID. Alternatively, the host and the NMS may further implement calculation of the first key in a hash manner or another calculation manner. This is not specifically limited herein.

Step 4a: The IDMS sends, to the host, a registration and authentication result of the host that is encrypted by using the first key and that is signed by using the private key of the IDMS. The registration and authentication result may include a second random number, the ID of the host, the private key of the host, a system parameter, an ID of the NMS, an IP of the NMS, and the like.

Step 4b: After receiving the registration and authentication result, the host performs signature authentication by using the ID of the IDMS, and decrypts the registration and authentication result by using the first key, to complete the ID-based registration and authentication of the host.

Optionally, after the ID-based registration and authentication of the host are completed, the host and the mapping management server may negotiate for the second key, to perform registration and authentication in the NMS. The host is provided with an ID-IP mapping query service by using the NMS. Details are as follows:

Step 5a: The host calculates a second key based on the ID of the NMS and the second random number that are obtained in step 4. Specifically, the host generates the second key SK2 through calculation by using SK2=F(Host1, Nonce 1, Nonce 2, NMS_ID). For example, SK2=HostID+Nonce 1+Nonce 2+NMS_ID. Alternatively, the host may further implement calculation of the second key in a hash manner or another calculation manner. This is not specifically limited herein.

Step 5b: The NMS also calculates the second key SK2 in the manner in step 5a.

Step 5c: When updating and a query for an IP and an ID are subsequently performed in communication between the host and the mapping server, the host and the mapping server separately perform encryption and decryption on exchanged messages by using the second key.

In the embodiment, information exchanged between the host and the IDMS is encrypted by using the first key obtained after negotiation between the host and the IDMS, and information exchanged between the host and the NMS is further encrypted by using the second key obtained after negotiation between the host and the NMS, thereby ensuring security performance in an information transmission process, simplifying an authentication procedure, and ensuring secure information transmission during ID-based host authentication.

Figure 10A:
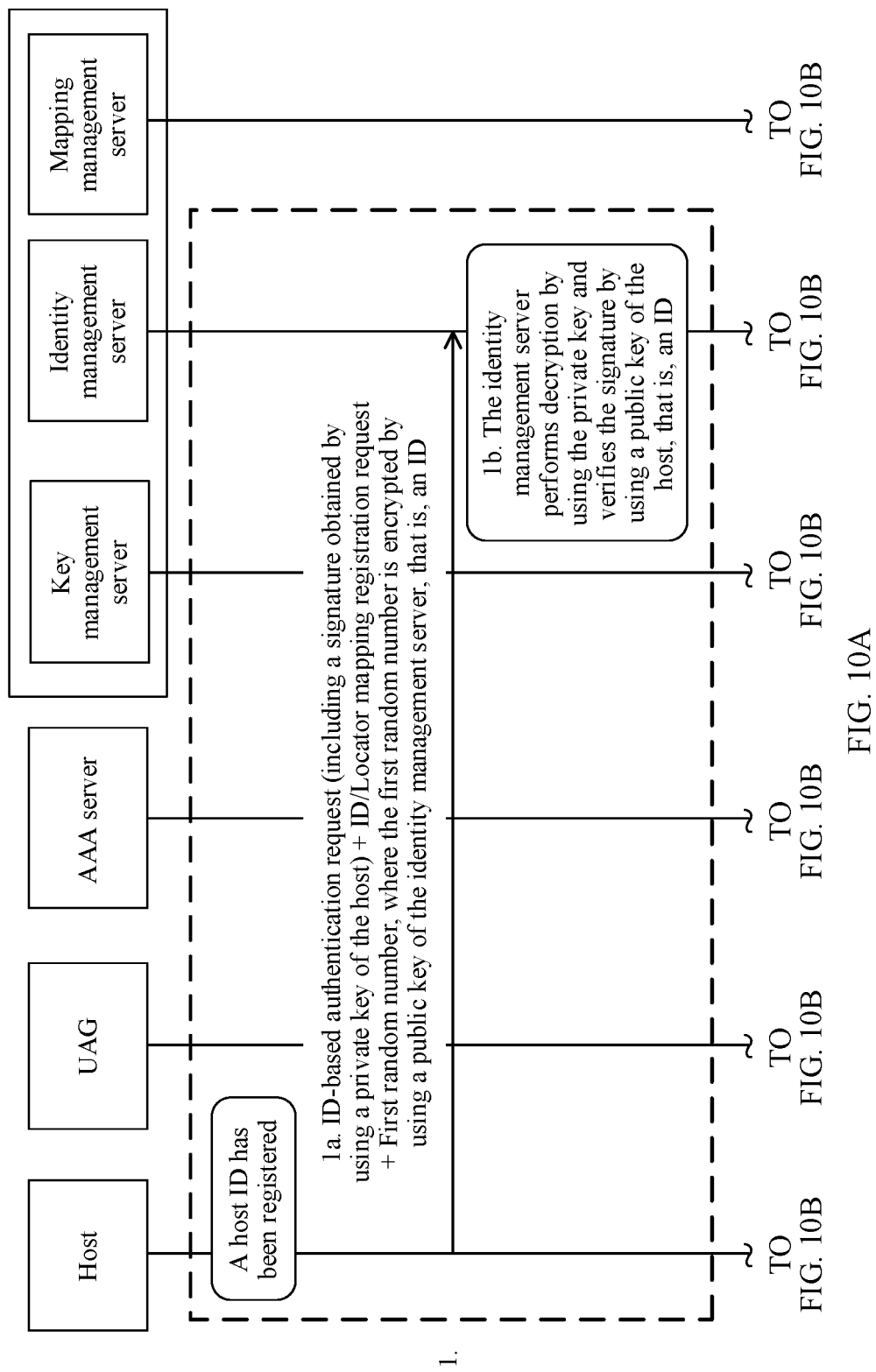
Figure 10B:
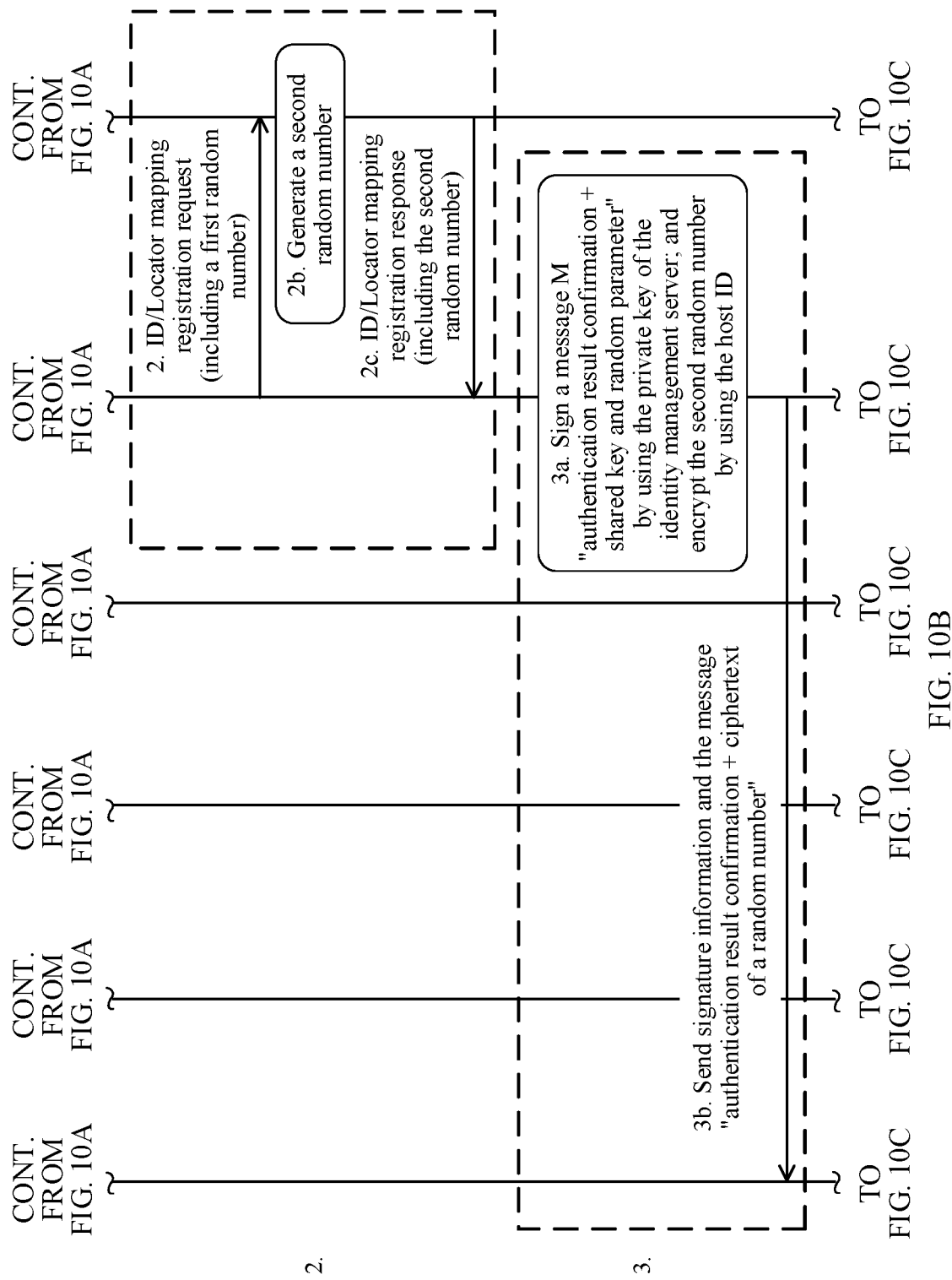

FIG. 10A to FIG. 10C are a schematic flowchart of Embodiment 9 of a key distribution method according to this application. The key distribution method shown in FIG. 10A to FIG. 10C in this application is based on the embodiment of FIG. 6. The terminal is a communications entity host Host, the identity management server is an ID management system or an ID management server IDMS in a GRIDS system, the mapping management server is a mapping system or a mapping server NMS in the GRIDS, and the key management server may be an identity key management system IKMS in the GRIDS. When the host passes registration and authentication of the IDMS but the host needs to request registration and authentication of the NMS again; or when the second key used between the host and the mapping management server is invalid, AAA authentication does not need to be performed on the host. Instead, only fast registration and authentication are performed based on the ID of the host. Specifically, as shown in FIG. 5, the ID-based host authentication method in this embodiment includes the following steps.

Step 1a: The host sends host authentication request information to the IDMS. The host authentication request information includes a mapping authentication request message and a first random number. The mapping authentication request message is used to request the NMS to determine a second key and request to register a mapping relationship for the host. The mapping authentication request message and the first random number are signed by using a private key of the host. The first random number is encrypted by using a public key of the IDMS, that is, an ID.

Step 1b: The IDMS receives the mapping authentication request and the first random number, decrypts the encrypted first random number by using a private key of the IDMS, and verifies, by using a public key of the host, a signature obtained by using the private key of the host, that is, the ID. When the verification succeeds, the identity authentication is completed for the host.

Step 2a: The IDMS sends the mapping authentication request and the first random number to the NMS.

Step 2b: The mapping management server establishes a mapping relationship between the IP and the ID of the host based on the mapping authentication request message, and generates a second random number.

Step 2c: The NMS sends a mapping registration result to the IDMS. The mapping registration result includes the second random number and the mapping relationship between the IP and the ID of the host.

Step 3a: The IDMS signs the mapping registration result and the second random number by using the private key of the IDMS, and encrypts the second random number by using the public key of the host, that is, the ID.

Step 3b: The IDMS sends a signature message, a mapping registration result, and the second random number to the host.

Step 4a: The host decrypts the encrypted second random number by using the private key of the host, and verifies the signature of the IDMS by using the public key of the IDMS, that is, the ID.

Step 4b: The host and the NMS generate a second key SK2 through calculation based on the first random number Nonce 1, the second random number Nonce 2, the ID of the host, and the ID of the NMS by using SK2=F(HostID, Nonce 1, Nonce 2, NMS_ID). For example, SK2=HostID+ Nonce 1+Nonce 2+NMS_ID. Calculation of the second key may also be implemented in another calculation manner. This is not specifically limited herein.

Step 4c: When updating and a query for an IP and an ID are subsequently performed in communication between the host and the mapping server, the host and the mapping server separately perform encryption and decryption on exchanged messages by using the second key.

In the embodiment, when the host that passes the ID-based registration requests registration of the NMS again, AAA authentication does not need to be performed on the host. Instead, fast registration and authentication are performed based on the ID of the host, thereby simplifying a host authentication procedure.

Optionally, in the foregoing embodiment, the terminal authentication request message sent by the terminal to the identity management server includes a mapping authentication request message. In other words, a message format in which the mapping authentication request message is combined into the terminal authentication request information may be designed by using the format shown in Table 1.

TABLE 1

| Terminal authentication request message | Mapping authentication request message | Ciphertext of a first random number | Indicates the signature information. |
|---|---|---|---|

A method for constructing signature information may be a hash abstract of "the terminal authentication request message"+"the mapping authentication request message"+"the first random number". Then the private key of the terminal is used to encrypt the abstract. A ciphertext of the abstract is used as signature information. In addition, a public key of a peer end (an ID of the peer end) is used to encrypt the first random number, to obtain a ciphertext of the first random number. As shown in the foregoing table, the key negotiation request message is constructed, and the ID-based fast authentication is implemented.

Correspondingly, after a receive end, that is, the identity management server in the foregoing embodiments receives the request message, the identity management server decrypts the encrypted first random number by using the private key corresponding to the ID of the identity management server, and verifies the signature information by using the ID of the terminal, that is, the public key.

Figure 11:
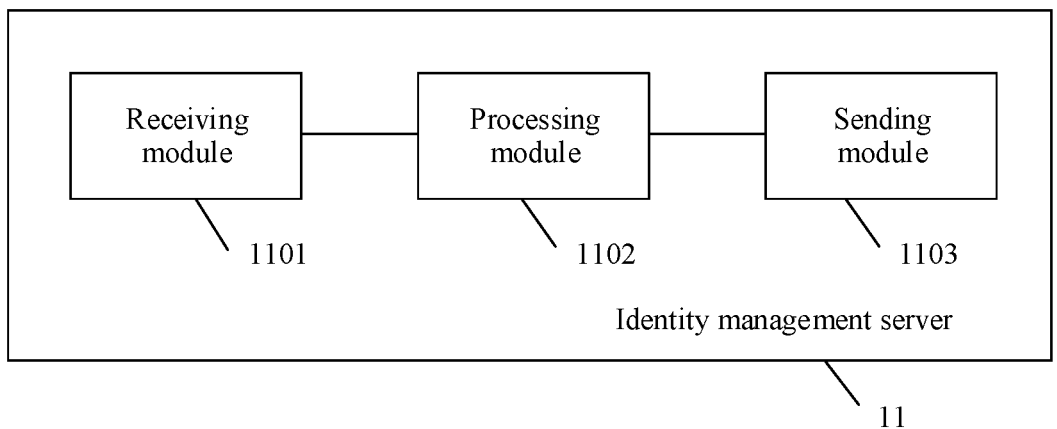
FIG. 11 is a schematic structural diagram of Embodiment 1 of an identity management server according to this application.

FIG. 11 is a schematic structural diagram of Embodiment 1 of an identity management server according to this application. As shown in FIG. 11, the identity management server 11 in this embodiment includes a receiving module 1101, a processing module 1102, and a sending module 1103. The receiving module 1101 is configured to receive an ID registration request message that is sent by a terminal by using a unified access gateway UAG, to request to register an ID of the terminal. The ID registration request message includes AAA authentication information. The processing module 1102 is configured to: determine, based on the AAA authentication information, whether AAA authentication on the terminal succeeds; and if the AAA authentication on the terminal succeeds, allocate the ID to the terminal, and send the ID of the terminal to a key management server. The receiving module 1101 is further configured to receive a private key of the terminal that is sent by the key management server. The private key is generated by the key management server by using the identity ID of the terminal as a public key. The processing module 1102 is further configured to negotiate with the terminal to generate a first key. The sending module 1103 is configured to send, to the terminal by using the UAG, the ID and the private key of the terminal that are encrypted by using the first key.

The identity management server provided in this embodiment may be configured to perform the key distribution method shown in FIG. 2. An implementation and a specific principle of the identity management server are the same as those of the key distribution method, and details are not described herein again.

Optionally, the sending module 1103 is further configured to send AAA authentication information of the terminal to an AAA server. The receiving module 1101 is further configured to receive an AAA authentication result of the terminal that is sent by the AAA server. The processing module 1102 is further configured to determine, based on the AAA authentication result, whether the AAA authentication on the terminal succeeds.

The identity management server provided in this embodiment may be configured to perform the key distribution methods described in FIG. 3 and FIG. 4. An implementation and a specific principle of the identity management server are the same as those of the key distribution methods described in FIG. 3 and FIG. 4, and details are not described again.

Optionally, the receiving module 1101 is further configured to receive the AAA authentication information of the terminal that is sent by the AAA server. The processing module 1102 is specifically configured to: determine whether the AAA authentication information of the terminal that is sent by the AAA server is the same as the AAA authentication information included in the registration and authentication request message sent by the terminal; and if the AAA authentication information of the terminal that is sent by the AAA server is the same as the AAA authentication information included in the registration and authentication request message sent by the terminal, determine that the AAA authentication on the terminal succeeds.

The identity management server provided in this embodiment may be configured to perform the key distribution method shown in FIG. 5. An implementation and a specific principle of the identity management server are the same as those of the key distribution method, and details are not described herein again.

Optionally, the receiving module 1101 is further configured to receive a mapping registration request message sent by the terminal, to request a mapping management server to register the terminal. The mapping registration request message includes the ID of the terminal, a location of the terminal, and a first random number encrypted by using an ID of the identity management server, and the mapping registration request message is signed by using the private key of the terminal. The processing module 1102 is further configured to: verify, by using the ID of the terminal, a signature obtained by using the private key of the terminal; obtain the first random number through decryption by using the private key of the identity management server; and send a mapping authentication request message to the mapping management server. The receiving module 1101 is further configured to receive a second random number that is generated and sent by the mapping management server. The sending module 1103 is further configured to: send, to the terminal, the second random number that is signed by using the private key of the identity management server and that is encrypted by using the ID of the terminal, so that the terminal obtains the second random number through decryption by using the private key of the terminal and verifies, by using the ID of the identity management server, a signature obtained by using the private key of the identity management server, the terminal and the mapping management server obtain the second key through calculation based on the first random number, the second random number, the ID of the terminal, and an ID of the mapping management server, and the mapping management server provides the terminal with an ID-locator mapping query service.

The identity management server provided in this embodiment may be configured to perform the key distribution method shown in FIG. 6. An implementation and a specific principle of the identity management server are the same as those of the key distribution method, and details are not described herein again.

Figure 12:
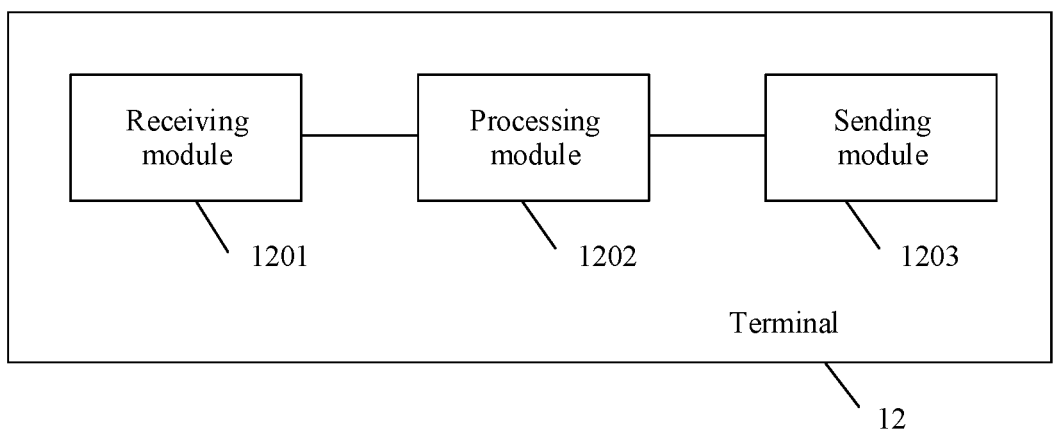
FIG. 12 is a schematic structural diagram of Embodiment 1 of a terminal according to this application.

FIG. 12 is a schematic structural diagram of Embodiment 1 of a terminal according to this application. As shown in FIG. 12, the terminal 12 in this embodiment includes a receiving module 1201, a processing module 1202, and a sending module 1203. The sending module 1203 is configured to send an ID registration request message to an identity management server by using a unified access gateway UAG, to request to register an ID of the terminal. The ID registration request message includes AAA authentication information. The processing module 1202 is configured to negotiate with the identity management server to generate a first key. The receiving module 1201 is configured to receive the ID of the terminal and a private key of the terminal that are encrypted by using the first key and that are sent by the identity management server. The private key is generated by a key management server by using the identity ID of the terminal as a public key. The processing module 1202 is further configured to obtain the ID of the terminal and the private key of the terminal through decryption by using the first key.

The terminal provided in this embodiment may be configured to perform the key distribution method shown in FIG. 2. An implementation and a specific principle of the terminal are the same as those of the key distribution method, and details are not described herein again.

Optionally, the processing module 1202 is further configured to negotiate with the mapping management server for a second key. The second key is used to encrypt a communication message between the terminal and the mapping management server, and the mapping management server provides the terminal with an ID-locator mapping query service.

The terminal provided in this embodiment may be configured to perform the key distribution methods described in FIG. 3 to FIG. 5. An implementation and a specific principle of the terminal are the same as those of the key distribution methods described in FIG. 3 to FIG. 5, and details are not described again.

The sending module 1203 is further configured to send a mapping registration request message to the identity management server to request the mapping management server to register the terminal. The mapping registration request message includes the ID of the terminal, a locator of the terminal, and a first random number encrypted by using an ID of the identity management server, and the mapping registration request message is signed by using the private key of the terminal. The receiving module 1201 is configured to receive a second random number that is signed by using a private key of the identity management server, encrypted by using the ID of the terminal, and sent by the identity management server. The processing module 1202 is configured to: verify, by using the ID of the identity management server, a signature obtained by using the private key of the identity management server; and obtain the second random number through decryption by using the private key of the terminal. The processing module 1202 is further configured to obtain the second key through calculation based on the first random number, the second random number, the ID of the terminal, and an ID of the mapping management server. The second key is used to encrypt a communication message between the terminal and the mapping management server, and the mapping management server provides the terminal with the ID-locator mapping query service.

The terminal provided in this embodiment may be configured to perform the key distribution method shown in FIG. 6. An implementation and a specific principle of the terminal are the same as those of the key distribution method, and details are not described herein again.

An embodiment further provides a key distribution system, including the identity management server in any one of the foregoing embodiments and the terminal in any one of the foregoing embodiments. As shown in FIG. 1, a structure of the key distribution system further includes a unified access gateway UAG, a mapping management server, an AAA server, and a key management server. The system provided in this embodiment is configured to perform the key distribution methods described in the foregoing embodiments. An implementation and a specific principle of the system are the same as those of the key distribution methods described in the foregoing embodiments, and details are not described again.

An embodiment of this application further provides a secret storage medium, including a readable storage medium and a computer program. The computer program is stored in the readable storage medium, and the computer program is used to implement the key distribution method in the foregoing embodiments.

An embodiment of this application further provides a program product. The program product includes a computer program (that is, an executable instruction), and the computer program is stored in a readable storage medium. At least one processor of an encoding device may read the computer program from the readable storage medium. The at least one processor executes the computer program so that the encoding device performs the key distribution methods provided in the foregoing implementations.

Persons of ordinary skill in the art may understand that all or some of the steps of the method embodiments may be implemented by a program instructing related hardware. The foregoing program may be stored in a computer readable storage medium. When the program is executed, the steps of the foregoing method embodiments are performed. The foregoing storage medium includes various media that can store program code, such as a ROM, a RAM, a magnetic disk, or an optical disc. Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A key distribution method, comprising:
receiving, by an identity management server, authentication, authorization, and accounting (AAA) authentication information of a terminal sent by an AAA server and then receiving, by the identity management server, an ID registration request message sent by the terminal by using a unified access gateway (UAG), to request to register an identity (ID) of the terminal, wherein the ID registration request message comprises the AAA authentication information;

determining, by the identity management server based on the AAA authentication information, whether AAA authentication on the terminal succeeds; and if the AAA authentication on the terminal succeeds, allocating the ID to the terminal, and sending the ID of the terminal to a key management server;

receiving, by the identity management server, a private key of the terminal sent by the key management server, wherein the private key is generated by the key management server by using the identity (ID) of the terminal as a public key;

negotiating, by the terminal and the identity management server, to generate a first key; and sending, by the identity management server to the terminal by using the UAG, the ID and the private key of the terminal that are encrypted by using the first key;

wherein determining whether AAA authentication on the terminal succeeds comprises:

determining whether the AAA authentication information of the terminal sent by the AAA server is the same as the AAA authentication information comprised in the ID registration request message sent by the terminal; and if the AAA authentication information of the terminal sent by the AAA server is the same as the AAA authentication information comprised in the ID registration request message sent by the terminal, determining that the AAA authentication on the terminal succeeds.

2. The method according to claim 1, wherein after sending the ID and the private key of the terminal, the method further comprises:

receiving, by the identity management server, a mapping registration request message sent by the terminal, to request a mapping management server to register the terminal, wherein the mapping registration request message comprises the ID of the terminal, a location of the terminal, and a first random number encrypted by using an ID of the identity management server, and the mapping registration request message is signed by using the private key of the terminal;

verifying, by the identity management server by using the ID of the terminal, a signature obtained by using the private key of the terminal; obtaining the first random number through decryption by using a private key of the identity management server; and sending a mapping authentication request message to the mapping management server;

receiving, by the identity management server, a second random number that is generated and sent by the mapping management server; and sending, by the identity management server to the terminal, the second random number that is signed by using the private key of the identity management server and that is encrypted by using the ID of the terminal, so that the terminal obtains the second random number through decryption by using the private key of the terminal and verifies, by using the ID of the identity management server, a signature obtained by using the private key of the identity management server, the terminal and the mapping management server obtain the second key through calculation based on the first random number, the second random number, the ID of the terminal, and an ID of the mapping management server, and the mapping management server provides the terminal with an ID-locator mapping query service.

3. An identity management server, comprising:
a receiving module configured to receive authentication, authorization, and accounting (AAA) authentication information of a terminal sent by an AAA server, and then to receive an identity (ID) registration request message sent by the terminal by using a unified access gateway (UAG), to request to register an ID of the terminal, wherein the ID registration request message comprises AAA authentication information; and a processing module configured to: determine, based on the AAA authentication information, whether AAA authentication on the terminal succeeds; and if the AAA authentication on the terminal succeeds, allocate the ID to the terminal, and send the ID of the terminal to a key management server, wherein determining whether AAA authentication on the terminal succeeds comprises:

determining whether the AAA authentication information of the terminal sent by the AAA server is the same as the AAA authentication information comprised in the ID registration request message sent by the terminal; and if the AAA authentication information of the terminal sent by the AAA server is the same as the AAA authentication information comprised in the ID registration request message sent by the terminal, determining that the AAA authentication on the terminal succeeds; wherein the receiving module is further configured to receive a private key of the terminal sent by the key management server, wherein the private key is generated by the key management server by using the identity (ID) of the terminal as a public key; and the processing module is further configured to negotiate with the terminal to generate a first key; and a sending module, wherein the sending module is configured to send, to the terminal by using the UAG, the ID and the private key of the terminal that are encrypted by using the first key.

4. The server according to claim 3, wherein
the receiving module is further configured to receive a mapping registration request message sent by the terminal, to request a mapping management server to register the terminal, wherein the mapping registration request message comprises the ID of the terminal, a location of the terminal, and a first random number encrypted by using an ID of the identity management server, and the mapping registration request message is signed by using the private key of the terminal;

the processing module is further configured to: verify, by using the ID of the terminal, a signature obtained by using the private key of the terminal; obtain the first random number through decryption by using the private key of the identity management server; and send a mapping authentication request message to the mapping management server;

the receiving module is further configured to receive a second random number that is generated and sent by the mapping management server; and the sending module is further configured to: send, to the terminal, the second random number that is signed by using the private key of the identity management server and that is encrypted by using the ID of the terminal, so that the terminal obtains the second random number through decryption by using the private key of the terminal and verifies, by using the ID of the identity management server, a signature obtained by using the private key of the identity management server, the terminal and the mapping management server obtain the second key through calculation based on the first random number, the second random number, the ID of the terminal, and an ID of the mapping management server, and the mapping management server provides the terminal with an ID-locator mapping query service.

\* \* \* \* \*